United States Patent [19]

Ohshita

[11] Patent Number: 5,640,277
[45] Date of Patent: Jun. 17, 1997

[54] LARGE APERTURE MEDIUM TELEPHOTO LENS SYSTEM

[75] Inventor: Koichi Ohshita, Tokyo, Japan

[73] Assignee: Nikon Corporation, Tokyo, Japan

[21] Appl. No.: 364,218

[22] Filed: Dec. 27, 1994

[30] Foreign Application Priority Data

Dec. 28, 1993 [JP] Japan .................. 5-353455

[51] Int. Cl.$^6$ .............. G02B 9/12; G02B 15/14; G02B 13/02
[52] U.S. Cl. ............. 359/792; 359/684; 359/746; 359/748
[58] Field of Search ............... 359/792, 745, 359/746, 747, 748, 754, 755, 774, 772, 684, 681, 682

[56] References Cited

U.S. PATENT DOCUMENTS

| | | | |
|---|---|---|---|
| 4,812,027 | 3/1989 | Yanagisawa | 359/755 |
| 4,848,883 | 7/1989 | Maruyama | 359/684 |
| 4,991,943 | 2/1991 | Betensky | 359/684 |
| 5,172,274 | 12/1992 | Hirakawa | 359/745 |
| 5,272,564 | 12/1993 | Suzuki et al. | 359/676 |

*Primary Examiner*—Scott J. Sugarman
*Assistant Examiner*—Jordan M. Schwartz
*Attorney, Agent, or Firm*—Armstrong, Westerman, Hattori, McLeland & Naughton

[57] ABSTRACT

The lens system includes, in order from an object side, a 1-st lens unit having a positive refractive power which has at least two positive lens elements and a negative lens element positioned on an image side of said positive lens elements, a 2-nd lens unit having a positive refractive power and a 3-rd lens unit having a positive refractive power. During focusing, both 1-st and 3-rd lens units are fixed, whereas the 2-nd lens unit is movable along an optical axis. The lens system satisfies at least one of the conditions $1.8 < F1/f < 2.4$ and $0.8 < F2/f < 0.96$.

39 Claims, 26 Drawing Sheets

Fig. 25(a)
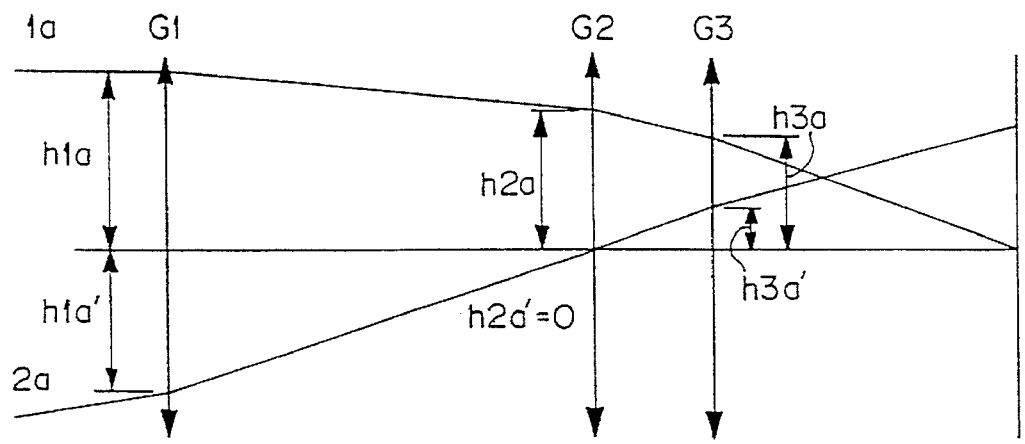
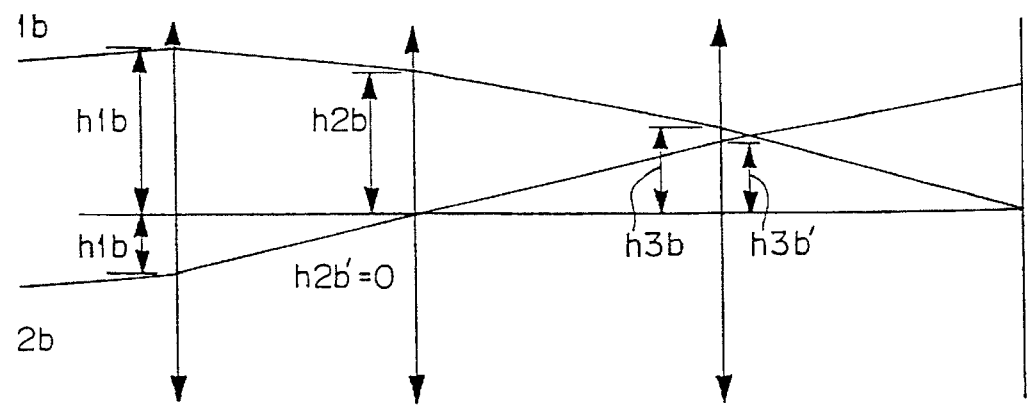
Fig. 25(b)

LARGE APERTURE MEDIUM TELEPHOTO LENS SYSTEM

BACKGROUND OF THE INVENTION

1. Field of the Invention

The present invention relates to medium telephoto lens systems and, more particularly, to a medium telephoto lens system having a large aperture ratio (hereinafter referred to as "A large aperture medium telephoto lens system").

2. Description of the Related Art

As medium telephoto lenses, Gauss type lenses and modified Gauss type lenses have heretofore been widely used because these lenses have excellent image-forming performance despite a simple lens arrangement composed of 6 to 8 lens elements.

Further, in recent years, so called "floating technique" has been introduced into medium telephoto lens systems of the type described above. Consequently, it has become possible to obtain excellent performance for objects in the object distance range of from the infinite object point to the nearest object point as far as flat image-forming performance is concerned.

Meanwhile, autofocus single-lens reflex cameras have recently spread remarkably. As a result, interchangeable lenses have also been demanded to reduce the weight of a lens unit movable during focusing and to shorten the distance through which the lens unit moves to effect focusing.

However, the focusing method used with the conventional Gauss type lens is to move the entire lens system to effect focusing or to vary a specific lens spacing while moving the entire lens system. In either case, the entire lens system, which is heavy, must be moved through a relatively long distance. Therefore, the conventional Gauss type lens is not suitable for use in an autofocus camera from the viewpoint of focusing speed and power consumption.

To solve the problem, the present applicant has proposed lens systems which are disclosed, for example, in Japanese Patent Application Laid Open No. 03-200909 and U.S. Pat. No. 4,812,027.

The lens systems disclosed in the above-mentioned publications are of the rear focusing type, which is composed of a front lens unit having three lens elements, i.e., a positive lens element, a positive lens element, and a negative lens element, based on the front lens group of the Gauss type lens, and a rear lens unit including a plurality of lens elements and having a positive refractive power as a whole. In the rear focusing type, focusing is effected by moving only the rear lens unit.

However, the rear focusing system suffers from the disadvantage that the closest distance performance (i.e., the image-forming performance for an object at the closest focusing distance) generally degrades in the case of "fast" lenses having an f-number smaller than 1.7, although it can make excellent aberration correction for relatively "slow" lenses having an f-number larger than 1.7.

The rear focusing system further involves the problem that the balance between spherical aberration and field curvature deteriorates at a specific object distance.

In view of the above-described problems, an object of the present invention is to provide a large aperture medium telephoto lens system which is capable of focusing by movement of a lens unit having a minimal number of lens elements and yet excellent in the closest distance performance.

SUMMARY OF THE INVENTION

To attain the above-described object, the present invention provides a lens system including, in order from the object side, a 1-st lens unit having a positive refractive power, a 2-nd lens unit having a positive refractive power, and a 3-rd lens unit having a positive refractive power. During focusing, both the 1-st and 3-rd lens units are fixed, whereas the 2-nd lens unit is movable along an optical axis. The lens system satisfies the following conditions (1) to (3):

$$1.8 < F1/f < 2.4 \tag{1}$$

$$0.8 < F2/f < 0.96 \tag{2}$$

$$9 < F3/f < 20 \tag{3}$$

where

F1: the focal length of the 1-st lens unit;
F2: the focal length of the 2-nd lens unit;
F3: the focal length of the 3-rd lens unit; and
f: the focal length of the entire lens system.

A lens system having excellent closest distance performance can also be obtained when any one of the above conditions (1) to (3), or two of them, that is, (1) and (3), or (2) and (3), are satisfied.

In addition, the present invention provides a lens system including, in order from the object side, a 1-st lens unit having a positive refractive power, a 2-nd lens unit having a positive refractive power, and a 3-rd lens unit having a positive refractive power. The 1-st lens unit includes, in order from the object side, a positive lens element having a convex surface directed toward the object side, a positive meniscus lens element having a convex surface directed toward the object side, and a negative meniscus lens element having a convex surface directed toward the object side. The 2-nd lens unit includes two sub units, that is, a front sub unit and a rear sub unit, in order from the object side. The front sub unit includes, in order from the object side, a positive lens element having a convex surface directed toward the object side, and a negative lens element whose image-side surface is more steeply concaved than the object-side surface thereof. The rear sub unit includes, in order from the object side, a cemented lens component and a positive lens element. The cemented lens component is composed of a negative lens element having a concave surface directed toward the object side, and a positive lens element having a convex surface directed toward the image side. The 2-nd lens unit further includes an aperture stop disposed between the front and rear sub units. The 3-rd lens unit has a positive lens element. The lens system satisfies the following conditions (4) to (6):

$$0.28 < D1/f < 0.36 \tag{4}$$

$$0.19 < S1/f < 0.23 \tag{5}$$

$$0.62 < r1/f < 1.0 \tag{6}$$

where

D1: the axial thickness of the 1-st lens unit;
S1: the axial air spacing between the 1-st and 2-nd lens units when the lens system is focused at the infinite object point; and
r1: the radius of curvature of the object-side surface of the positive lens element closest to the object side in the 1-st lens unit.

In the present invention, the following condition (7), (15) or (17) may be satisfied instead of the condition (6).

Alternatively, the following two conditions (8) and (9), or (10) and (11) may be satisfied instead of the condition (6). Further, the conditions (1) to (3), or the conditions (6) and (7) may be satisfied instead of the conditions (4) to (6).

$$-0.8 < r10/r9 < 0 \quad (7)$$

$$0.08 < Da/f < 0.13 \quad (8)$$

$$0.07 < Db/f < 0.13 \quad (9)$$

$$-3 < Fa/f < -1.5 \quad (10)$$

$$0.57 < Fb/f < 0.7 \quad (11)$$

$$15 < v1-v2 < 27 \quad (15)$$

$$3 < v8-v4 < 12 \quad (17)$$

where r9: the radius of curvature of the object-side surface of that negative lens element in the 2-nd lens unit whose image-side surface is more steeply concaved than the object-side surface thereof;

r10: the radius of curvature of the image-side surface of that negative lens element in the 2-nd lens unit whose image-side surface is more steeply concaved than the object-side surface thereof;

Da: the axial thickness of the front sub unit in the 2-nd lens unit;

Db: the axial air spacing between the front and rear sub units in the 2-nd lens unit when the lens system is focused at the infinite object point;

Fa: the focal length of the front sub unit in the 2-nd lens unit;

Fb: the focal length of the rear sub unit in the 2-nd lens unit;

v1: the Abbe's number of the positive lens element in the 1-st lens unit that is closest to the object side;

v2: the Abbe's number of the second positive lens element in the 1-st lens unit from the object side;

v4: the Abbe's number of the positive lens element in the 2-nd lens unit that is closest to the object side; and v8: the Abbe's number of the positive lens element in the 2-nd lens unit that is closest to the image side.

BRIEF DESCRIPTION OF THE DRAWINGS

FIGS. 25(a) and 25(b) schematically show the refractive power distribution in the a large aperture medium telephoto lens system according to the present invention, together with the focusing operation thereof.

DETAILED DESCRIPTION OF PREFERRED EMBODIMENTS

Figure 1:
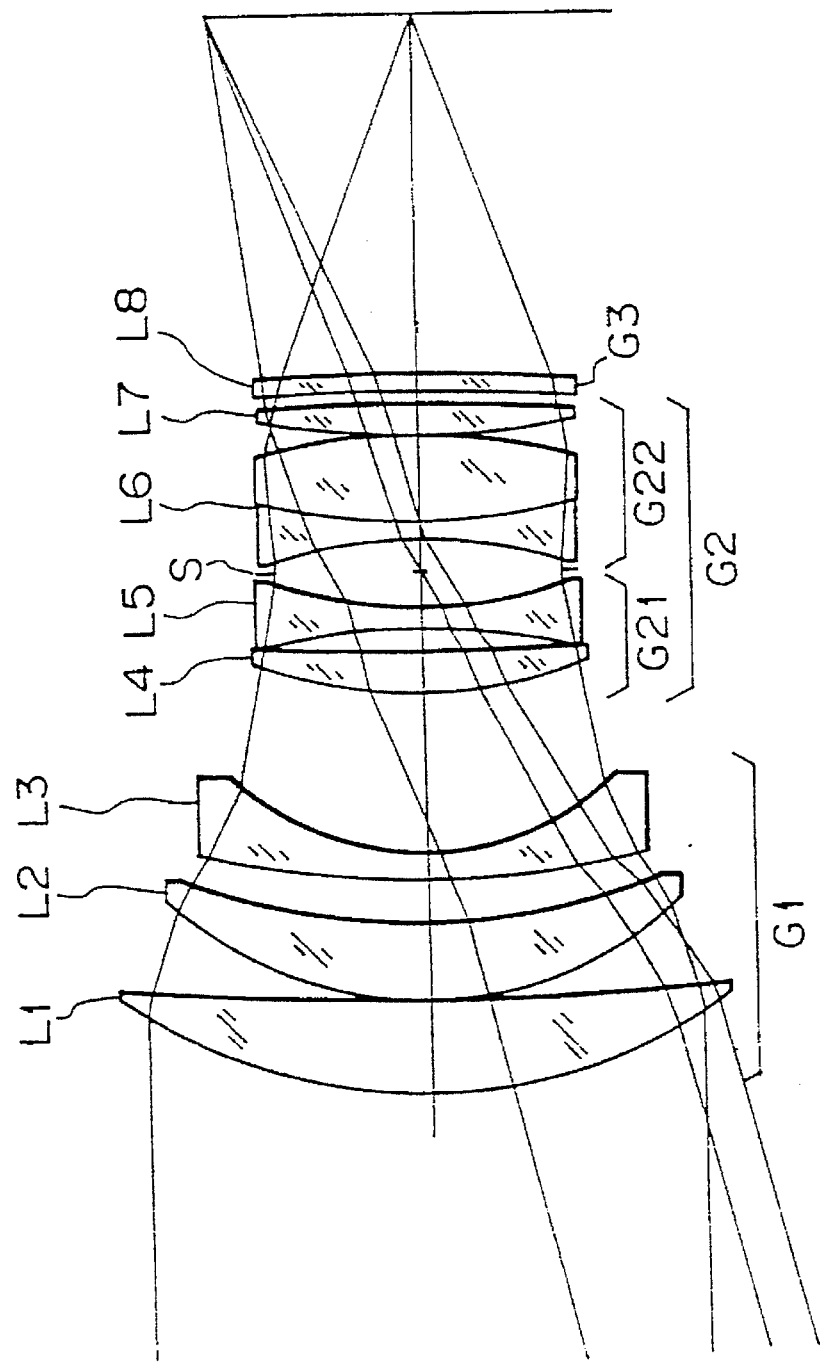
FIG. 1 shows the lens arrangement of a large aperture medium telephoto lens system according to a first embodiment of the present invention.

In each of the following embodiments thereof, the a large aperture medium telephoto lens system of the present invention includes, in order from the object side, a 1-st lens unit G1 having a positive refractive power, a 2-nd lens unit G2 having a positive refractive power, and a 3-rd lens unit G3 having a positive refractive power. During focusing, both the 1-st lens unit G1 and the 3-rd lens unit G3 are fixed, whereas the 2-nd lens unit G2 is movable along an optical axis. The lens system satisfies the conditions described below.

Each of the conditions of the present invention will be explained below.

The large aperture medium telephoto lens system of the present invention, which has the above-described arrangement, satisfies the following conditions (1) to (3):

$$1.8 < F1/f < 2.4 \quad (1)$$

$$0.8 < F2/f < 0.96 \quad (2)$$

$$9 < F3/f < 20 \quad (3)$$

where

F1: the focal length of the 1-st lens unit G1;
F2: the focal length of the 2-nd lens unit G2;
F3: the focal length of the 3-rd lens unit; and
f: the focal length of the entire lens system.

The conditions (1) to (3) specify for each lens unit a focal length suitable for the mechanism or aberration correction.

The condition (1), which specifies an appropriate focal length range for the 1-st lens unit G1, relates to the correction of spherical aberration and the balance between field curvature and spherical aberration.

If F1/f is not smaller than the upper limit of the condition (1), i.e., 2.4, it becomes difficult to obtain a good balance between the spherical aberration and the field curvature when the lens system is focused at the nearest object point, although the spherical aberration can be effectively corrected.

If F1/f is not larger than the lower limit of the condition (1), i.e., 1.8, it becomes difficult to effectively correct the annular spherical aberration, and under-correction of the field curvature and the spherical aberration becomes remarkable when the lens system is focused at the nearest object point.

The condition (2), which specifies an appropriate focal length range for the 2-nd lens unit G2, relates to the lens movement for focusing, the arrangement for ensuring the required back focus, and the variation of spherical aberration.

If F2/f is not smaller than the upper limit of the condition (2), i.e., 0.96, the variation of spherical aberration is suppressed, and it is favorable for ensuring the required back focus. However, the amount of movement of the 2-nd lens unit G2 required to effect focusing increases, which goes against the object of the present invention. It should be noted that it is preferable to set the upper limit of the condition (2) to 0.9 with a view to obtaining an appropriate lens movement for achieving a reduction in the overall size of the lens system.

If F2/f is not larger than the lower limit of the condition (2), i.e., 0.8, the variation of spherical aberration increases, and it becomes difficult to ensure the required back focus, although it is possible to minimize the amount of movement of the 2-nd lens unit G2. It should be noted that it is preferable to set the lower limit of the condition (2) to 0.83 in order to ensure an adequate back focus.

The condition (3) must be satisfied in order to maintain an optimal balance between the spherical aberration and the field curvature at the nearest object point.

If F3/f is not smaller than the upper limit of the condition (3), i.e., 20, the refractive power of the 3-rd lens unit G3 becomes excessively small and less effective, so that the spherical aberration is under-corrected at the nearest object point, resulting in over-correction of the field curvature, unfavorably.

If F3/f is not larger than the lower limit of the condition (3), i.e., 9, the refractive power of the 3-rd lens unit G3 becomes excessively large, so that the spherical aberration is over-corrected at the nearest object point, resulting in under-correction of the field curvature. In addition, the amount of movement of the 2-nd lens unit G2 becomes undesirably large, causing the overall size of the lens system to increase disadvantageously.

In the present invention, it is preferable to satisfy the following conditions (4) and (5) in addition to the conditions (1) to (3):

$$0.28 < D1/f < 0.36 \quad (4)$$

$$0.19 < S1/f < 0.23 \quad (5)$$

where

D1: the axial thickness of the 1-st lens unit G1; and
S1: the axial air spacing between the 1-st and 2-nd lens units G1 and G2 when the lens system is focused at the infinite object point.

The condition (4) relates to the correction of spherical aberration at a standard object distance, and it must be satisfied in order to make favorable spherical aberration correction.

If D1/f is not larger than the lower limit of the condition (4), i.e., 0.28, it becomes difficult to effectively correct the spherical aberration occurring in the 1-st lens unit G1, and it is impossible to attain a large aperture ratio, which is an object of the present invention.

If D1/f is not smaller than the upper limit of the condition (4), i.e., 0.36, the axial thickness of the 1-st lens unit G1 (i.e., the distance along the optical axis from the surface closest to the object side to the surface closest to the image side) becomes excessively large, resulting in an increase in the overall size of the lens system and an increasing vignetting.

The condition (5) specifies an appropriate range for the spacing between the 1-st and 2-nd lens units G1 and G2 when the lens system is focused at the infinite object point.

If S1/f is not larger than the lower limit of the condition (5), i.e., 0.19, the spacing between the two lens units is excessively narrow, so that the two lens units interfere with each other when the lens system is focused at the nearest object point.

If S1/f is not smaller than the upper limit of the condition (5), i.e., 0.23, the spacing between the two lens units is excessively wide, so that a vignetting is likely to become insufficient.

Thus, the present invention enables the aberration variation to be effectively corrected.

According to another aspect of the present invention, a specific lens arrangement is provided for each lens unit. That is, it is preferable for each lens unit to have the following lens arrangement: The 1-st lens unit G1 includes, in order from the object side, a positive lens element L1 having a convex surface directed toward the object side, a positive meniscus lens element L2 having a convex surface directed toward the object side, and a negative meniscus lens element L3 having a convex surface directed toward the object side. The 2-nd lens unit G2 includes, in order from the object side, a front sub unit G21, a rear sub unit G22, and an aperture stop A disposed between the front and rear sub units G21 and G22. The front sub unit G21 includes, in order from the object side, a positive lens element L4 having a convex surface directed toward the object side, and a negative lens element L5 whose image-side surface is more steeply concaved than the object-side surface thereof. The rear sub unit G22 includes, in order from the object side, a cemented lens component L6 and a positive lens element L7. The cemented lens component L6 is composed of a negative lens element having a concave surface directed toward the object side, and a positive lens having a convex surface directed toward the image side. The 3-rd lens unit G3 has a positive lens element L8.

The 1-st lens unit G1 has an arrangement based on the front lens group of the Gauss type lens, and it converges a bundle of light rays while suppressing the occurrence of spherical aberration and astigmatism. The 1-st lens unit G1 further forms a tele converter of a positive and a negative lens element, which are disposed in the mentioned order from the object side, to suppress the increase in the size of and the amount of movement of the 2-nd lens unit G2.

The 2-nd lens unit G2 serves as a movable lens unit, which is moved during focusing, and it is based on the Tessar type lens. More specifically, the 2-nd lens unit G2 includes a front sub unit having a positive lens element and a negative lens element, a rear sub unit having a cemented lens component of a negative and a positive lens element, together with a positive lens element, and an aperture stop A disposed between the front and rear sub units.

The 3-rd lens unit G3 is comprised of a positive lens element having a weak refractive power, which serves as an aberration correcting lens unit during focusing. In the lens element L5 and component L6, which lie in front of and behind the aperture stop A, the surfaces which face the aperture stop A are strongly concaved with respect to the aperture stop A. The lens elements L1 to L5 constitute a front lens group, and the lens elements L6 to L8 constitute a rear lens group. Thus, the entire lens system is composed of the front and rear lens groups, which are arranged in the form of a modified Gauss type lens, thereby enabling aberrations to be effectively corrected despite a fast lens system having an f-number of 1.4.

In the above-described specific lens arrangement, it is preferable to satisfy the following conditions (4) to (7):

$$0.28 < D1/f < 0.36 \quad (4)$$

$$0.19 < S1/f < 0.23 \quad (5)$$

$$0.62 < r1/f < 1.0 \quad (6)$$

$$-0.8 < r10/r9 < 0 \quad (7)$$

where r1: the radius of curvature of the object-side surface of the positive lens element closest to the object side in the 1-st lens unit G1;

r9: the radius of curvature of the object-side surface of the 5-th negative lens element L5; and r10: the radius of curvature of the image-side surface of the 5-th negative lens element L5.

The condition (4) relates to the correction of spherical aberration at a standard object distance, and it must be satisfied in order to make favorable spherical aberration correction, as described above.

If D1/f is not larger than the lower limit of the condition (4), i.e., 0.28, it becomes difficult to effectively correct the spherical aberration occurring in the 1-st lens unit G1, and it is impossible to attain a large aperture ratio, which is an object of the present invention.

If D1/f is not smaller than the upper limit of the condition (4), i.e., 0.36, the axial thickness of the 1-st lens unit G1 (i.e., the distance along the optical axis from the surface closest to the object side to the surface closest to the image side) becomes excessively large, resulting in an increase in the overall size of the lens system and a deficiency of a vignetting.

The condition (5) specifies an appropriate range for the spacing between the 1-st and 2-nd lens units G1 and G2 when the lens system is focused at the infinite object point, as described above.

If S1/f is not larger than the lower limit of the condition (5), i.e., 0.19, the spacing between the two lens units is excessively narrow, so that the two lens units interfere with each other when the lens system is focused at the nearest object point.

If S1/f is not smaller than the upper limit of the condition (5), i.e., 0.23, the spacing between the two lens units is excessively wide, so that a vignetting is likely to become insufficient.

The condition (6) specifies an appropriate range for the radius of curvature of the surface in the 1-st lens unit G1 that is closest to the object.

If r1/f is not smaller than the upper limit of the condition (6), i.e., 1.0, the annular spherical aberration is overcorrected, thus degrading the out-of-focus tone of the background, which is a problem that is associated with particularly this type of lens system. Further, it becomes difficult to correct astigmatism effectively.

If r1/f is not larger than the lower limit of the condition (6), i.e., 0.62, the annular spherical aberration is likely to be under-corrected. Therefore, the image-forming performance of the lens system when the aperture is decreased is likely to degrade because of the shift of focus from the position at full aperture. In addition, the radius of curvature of the image-side surface of the 3-rd negative meniscus lens element L3 is likely to decrease. In such a case, it becomes difficult to correct the off-axis sagittal comatic flare.

The condition (7) specifies the configuration of the 5-th negative lens element L5 in the 2-nd lens unit G2.

If r10/r9 is not larger than the lower limit of the condition (7), i.e., −0.8, the radius of curvature of the object-side surface of the 6-th cemented lens component L6 increases on account of the correction of comatic aberration. Therefore, it becomes difficult to ensure the required back focus and to correct the upper comatic aberration at a middle angle of view.

If r10/r9 is not smaller than the upper limit of the condition (7), i.e., 0, the radius of curvature of the object-side surface of the 5-th negative lens element L5 becomes excessively large. Consequently, it becomes difficult to correct the lower comatic aberration at a middle angle of view.

It is preferable to satisfy the following conditions (8) and (9) in addition to the above-described conditions:

$$0.08 < Da/f < 0.13 \quad (8)$$

$$0.07 < Db/f < 0.13 \quad (9)$$

where

Da: the axial thickness of the front sub unit G21 in the 2-nd lens unit G2; and

Db: the axial air spacing between the front and rear sub units G21 and G22 in the 2-nd lens unit G2 when the lens system is focused at the infinite object point.

The condition (8) specifies the axial thickness of the front sub unit G21 in the 2-nd lens unit G2. In general, as the axial thickness of a lens system increases, it becomes possible to correct various aberrations even more effectively, but it also becomes more likely that the overall size of the lens system will increase, and that a vignetting will reduce. Particularly, in the case of a lens system in which a large air spacing must be provided between the 1-st lens unit G1 and the 2-nd lens unit G2, as in the lens system of the present invention, an increase in the axial thickness of the front sub unit G21 causes an increase in the degree of asymmetry of the lens thickness on the object and image sides of the aperture stop. Consequently, it is likely that a vignetting will reduce, and that the off-axis performance will degrade.

The upper limit of the condition (8) indicates the tolerance limit with respect to the lowering of a vignetting and the degradation of the off-axis performance, whereas the lower limit of the condition (8) indicates the tolerance limit below which the spherical aberration cannot satisfactorily be corrected.

In a case where an aperture stop is provided in the 2-nd lens unit G2 in the above-described specific lens arrangement, it may be disposed on the image side of the 4-th positive lens element L4, or on the image side of the 5-th negative lens element L5, or the image side of the 6-th cemented lens component L6. However, it is most favorable to provide an aperture stop on the image side of the 5-th negative lens element L5 for the reasons stated below:

If an aperture stop is provided on the image side of the 4-th positive lens element L4, the symmetry of the bundle of light rays improves, and it is therefore favorable for the correction of the field curvature and the lateral chromatic aberration. However, since the ray bundle passes asymmetrically the mutually opposing strong concave surfaces of the 5-th and 6-th lens units L5 and L6, it is difficult to correct, particularly, the upper comatic aberration. Consequently, the out-of-focus tone is likely to degrade.

If an aperture stop is provided on the image side of the 6-th cemented lens component L6, the quantity of lower ray bundle becomes insufficient, and an enormous increase in the front lens diameter and aggravation of the lateral chromatic aberration are inevitable.

If, on the other hand, an aperture stop is disposed on the image side of the 5-th negative lens element L5, the 5-th negative lens element L5 and the negative lens element of the 6-th cemented lens component L6 are symmetrically disposed with respect to the aperture stop. Therefore, aberrations, particularly comatic aberration can be effectively corrected.

The condition (9) specifies the aperture stop spacing when the aperture stop is disposed on the image side of the 5-th negative lens element L5.

If Db/f is not smaller than the upper limit of the condition (9), i.e., 0.13, the aperture stop spacing becomes undesirably wide, causing reduction of a vignetting and degradation of the off-axis performance for the same reasons as in the case of the condition (8).

If Db/f is not larger than the lower limit of the condition (9), i.e., 0.07, the 5-th negative lens element L5 and the 6-th cemented lens component L6 interfere with each other, and it is therefore difficult to provide the aperture stop in the spacing.

Further, it is preferable to satisfy the following conditions (10) to (18) from the viewpoint of the arrangement or the correction of various aberrations:

$$-3 < Fa/f < -1.5 \quad (10)$$

$$0.57 < Fb/f < 0.7 \quad (11)$$

$$0.47 < r3/f < 0.53 \quad (12)$$

$$0.9 < r13/r11 < 1.4 \quad (13)$$

$$-0.8 < f/r12 < 1.7 \quad (14)$$

$$15 < v1 - v2 < 27 \quad (15)$$

$$1.84 \leq n7 \quad (16)$$

$$3 < v8 - v4 < 12 \quad (17)$$

$$0.3 < r17/r16 < 0.9 \quad (18)$$

where

Fa: the focal length of the front sub unit G21 in the 2-nd lens unit G2;

Fb: the focal length of the rear sub unit G22 in the 2-nd lens unit G2;

r3: the radius of curvature of the object-side surface of the 2-nd positive meniscus lens element L2;

r11: the radius of curvature of the object-side surface of the 6-th cemented lens component L6;

r13: the radius of curvature of the image-side surface of the 6-th cemented lens component L6;

r12: the radius of curvature of the cemented surface of the 6-th cemented lens component L6;

r16: the radius of curvature of the object-side surface of the 8-th positive lens element L8;

r17: the radius of curvature of the image-side surface of the 8-th positive lens element L8;

n7: the refractive index for the spectral d-line of the positive lens element constituting the 6-th cemented lens component L6;

v1: the Abbe's number for the spectral d-line of the 1-st positive lens element L1;

v2: the Abbe's number for the spectral d-line of the 2-nd positive meniscus lens element L2;

v4: the Abbe's number for the spectral d-line of the 4-th positive lens element L4; and v8: the Abbe's number for the spectral d-line of the 7-th positive lens element L7.

However, when the 1-st positive lens component is a cemented lens which is composed of a negative and a positive lens element, v1 is expressed by the reduced Abbe's number given by $$v1 = 4 \cdot vx \cdot vy / (5 \cdot vx - vy) \quad (a)$$

where vx is the Abbe's number of the negative lens element, and vy is the Abbe's number of the positive lens element.

The condition (10) relates to the correction of aberration variation during the focusing operation.

If Fa/f is not smaller than the upper limit of the condition (10), i.e., −1.5, the spherical aberration is likely to be over-corrected, disadvantageously, when the lens system is focused at the nearest object point.

If the Fa/f is not larger than the lower limit of the condition (10), i.e., −3.0, the spherical aberration is unfavorably under-corrected at the nearest object point.

The condition (11) relates to the arrangement for ensuring the required back focus.

If Fb/f is not larger than the lower limit of the condition (11), i.e., 0.57, the back focus becomes excessively short. Thus, it becomes difficult to ensure an adequate back focus.

If Fb/f is not smaller than the upper limit of the condition (11), i.e., 0.7, it becomes impossible to correct the aberration variation during the focusing operation, or it becomes difficult to correct the spherical and comatic aberrations at the standard object distance.

The condition (12) relates to the correction of annular spherical aberration. The condition (12), together with the condition (6), must be satisfied in order to correct the annular spherical aberration effectively.

If r3/f is not smaller than the upper limit of the condition (12), i.e., 0.53, the angle of deflection of light rays at the object-side surface of the 2-nd positive meniscus lens element L2 becomes excessively large, and over-correction of the annular spherical aberration becomes remarkable.

If r3/f is not larger than the lower limit of the condition (12), i.e., 0.47, it becomes difficult to correct the positive comatic aberration at a middle angle of view when the annular spherical aberration is corrected.

The condition (13) relates to the correction of astigmatism.

If r13/r11 is not smaller than the upper limit of the condition (13), i.e., 1.4, the meridional image surface is over-corrected, whereas, if it is not larger than the lower limit, i.e., 0.9, the meridional image surface is under-corrected.

The condition (14) relates to the correction of chromatic aberrations of Rand ray.

If f/r12 is not smaller than the upper limit of the condition (14), i.e., 1.7, it becomes difficult to correct the chromatic aberration of Rand ray, whereas, if f/r12 is not larger than the lower limit, i.e., −0.8, the effect of the cemented surface becomes unfavorably weak, resulting in the Petzval sum being under-corrected.

The condition (15) relates to the correction of lateral chromatic aberration or chromatic aberration of astigmatic aberration.

If ν1−ν2 is not larger than the lower limit of the condition (15), i.e., 15, the dispersion of the 1-st positive lens element L1 increases, so that it becomes difficult to correct the lateral chromatic aberration and the chromatic aberration of the astigmatic aberration effectively.

The upper limit of the condition (15) is exceeded when a special low-dispersion glass is used for the 1-st positive lens element L1, or the 2-nd positive meniscus lens element L2 is made of an extremely high-dispersion vitreous material. In the former case, the cost rises; in the latter case, the 1-st lens unit G1 becomes incapable of correcting the chromatic aberration by itself. Consequently, the variation of axial chromatic aberration or lateral chromatic aberration is manifested unfavorably.

The condition (16) must be satisfied in order to correct the Petzval sum effectively.

If n7 is smaller than the lower limit of the condition (16), i.e., 1.84, the Petzval sum becomes excessively large on the positive side, so that it becomes difficult to correct the field curvature effectively.

The condition (17) relates to the balance of chromatic aberrations. It is a common practice in lens design to use a relatively high-dispersion glass near an aperture stop and a relatively low-dispersion glass at a position away from the aperture stop.

If ν8−ν4 is not smaller than the upper limit of the condition (17), i.e., 12, the dispersion of the 7-th positive lens element L7 becomes large, so that it becomes difficult to correct the lateral chromatic aberration when the dispersion of the 1-st positive lens element L1 is made low according to the condition (15).

If ν8−ν4 is not larger than the lower limit of the condition (17), i.e., 3, the dispersion of the 4-th positive lens element L4 becomes high, so that the axial chromatic aberration is under-corrected.

The condition (18) relates to the correction of the aberration variation during the focusing operation. If r17/r16 is outside the range defined by the upper and lower limits of the condition (18), it becomes difficult to balance the spherical aberration and the field curvature with each other.

Embodiments of the present invention will be described below with reference to the accompanying drawings.

First Embodiment:

FIG. 1 shows the lens arrangement of a large aperture medium telephoto lens system according to a first embodiment of the present invention.

As shown in FIG. 1, the a large aperture medium telephoto lens system includes, in order from the object side, a 1-st lens unit G1, a 2-nd lens unit G2, and a 3-rd lens unit G3. The 1-st lens unit G1 includes, in order from the object side, a positive meniscus lens element L1 having a convex surface directed toward the object side, a positive meniscus lens element L2 having a convex surface directed toward the object side, and a negative meniscus lens element L3 having a convex surface directed toward the object side. The 2-nd lens unit G2 includes, in order from the object side, a positive meniscus lens element L4 having a convex surface directed toward the object side, a biconcave lens element L5, an aperture stop S, a cemented lens component L6 of a biconcave lens element and a biconvex lens element, and a biconvex lens element L7. The 3-rd lens unit G3 has a positive meniscus lens element L8 having a concave surface directed toward the object side.

FIG. 1 shows the positional relationship between the lens units when the lens system is focused at the infinite object point. When the lens system is to be focused on an object at the closest focusing distance, the 2-nd lens unit G2 moves on the optical axis along an orbit indicated by the arrow in FIGS. 25(a) and 25(b).

The table below shows numerical data in the first embodiment of the present invention. In the table: f is the focal length when the lens system is focused at the infinite object point; FN is the f-number at the infinite object point; β is the image magnification when the lens system is focused at a near object point; and Bf is the back focus. In addition, the numerals at the left end show the ordinal Nos. of the lens surfaces from the object side, and r is the radius of curvature of each lens surface. d is the spacing between each pair of adjacent lens surfaces, and ν and ν are respectively the refractive index and the Abbe's number for the spectral d-line (λ=587.6 nm).

f = 85.00
FN = 1.43
Bf = 38.12

| | r | d | ν | n |
|---|---|---|---|---|
| 1 | 54.6447 | 10.4000 | 65.42 | 1.60300 |
| 2 | 386.2789 | 0.1000 | | |
| 3 | 41.3841 | 8.1000 | 46.55 | 1.80411 |
| 4 | 69.6421 | 4.7000 | | |
| 5 | 108.1534 | 2.4000 | 29.46 | 1.71736 |
| 6 | 28.1317 | (d6 = variable) | | |
| 7 | 46.3814 | 4.4000 | 39.61 | 1.80454 |
| 8 | 238.4203 | 2.4000 | | |
| 9 | −84.9337 | 2.2000 | 33.75 | 1.64831 |
| 10 | 44.2102 | 4.0000 | | |
| 11 | ∞ | 3.4000 | (stop) | |
| 12 | −53.7011 | 2.0000 | 32.17 | 1.67270 |
| 13 | 65.2634 | 9.5000 | 39.82 | 1.86994 |
| 14 | −57.8447 | 0.1000 | | |
| 15 | 93.4589 | 3.5000 | 47.47 | 1.78797 |
| 16 | −213.8583 | (d16 = variable) | | |
| 17 | −326.6053 | 2.0000 | 52.30 | 1.74810 |
| 18 | −245.1387 | 38.1202 | | |
| (Spacings variable during focusing) | | | | |

| | | | |
|---|---|---|---|
| f,β | 85.0001 | −0.1000 | |
| d6 | 17.7999 | 6.9908 | |
| d16 | 1.2001 | 12.0092 | |

-continued f = 85.00
FN = 1.43
Bf = 38.12

(Values corresponding to conditions)

| (1)  | F1/f   | = 2.094  |
| ---- | ------ | -------- |
| (2)  | F2/f   | = 0.882  |
| (3)  | F3/f   | = 15.295 |
| (4)  | D1/f   | = 0.302  |
| (5)  | S1/f   | = 0.209  |
| (6)  | r1/f   | = 0.643  |
| (7)  | r10/r9 | = -0.521 |
| (8)  | Da/f   | = 0.106  |
| (9)  | Db/f   | = 0.087  |
| (10) | Fa/f   | = -1.854 |
| (11) | Fb/f   | = 0.610  |
| (12) | r3/f   | = 0.487  |
| (13) | r13/r11| = 1.077  |
| (14) | f/r12  | = 1.302  |
| (15) | v1-v2  | = 18.87  |
| (16) | n7     | = 1.870  |
| (17) | v8-v4  | = 7.86   |
| (18) | r17/r16| = 0.751  |

Figure 2:
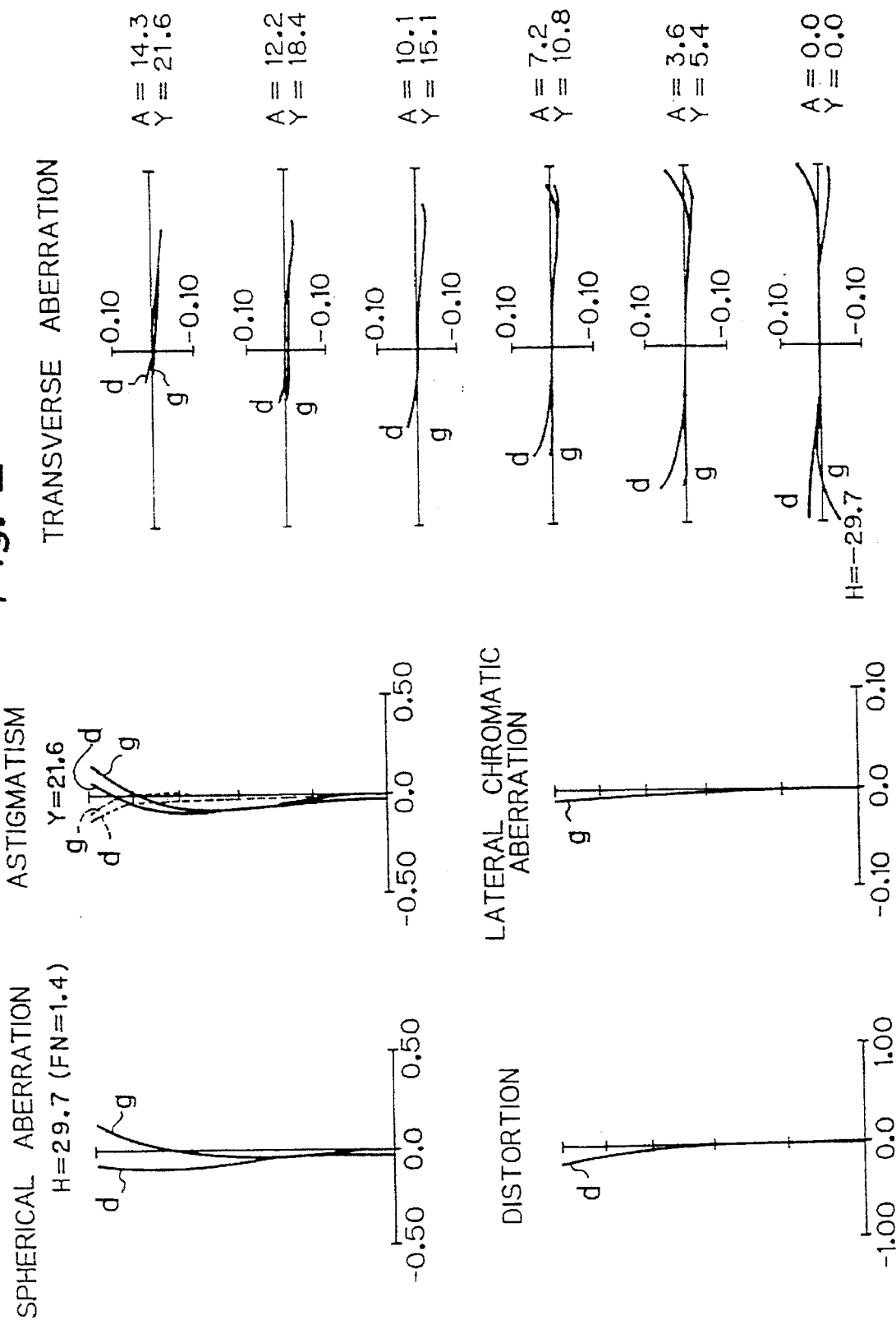
FIG. 2 graphically shows various aberrations when the lens system is focused at the infinite object point in the first embodiment.
Figure 3:
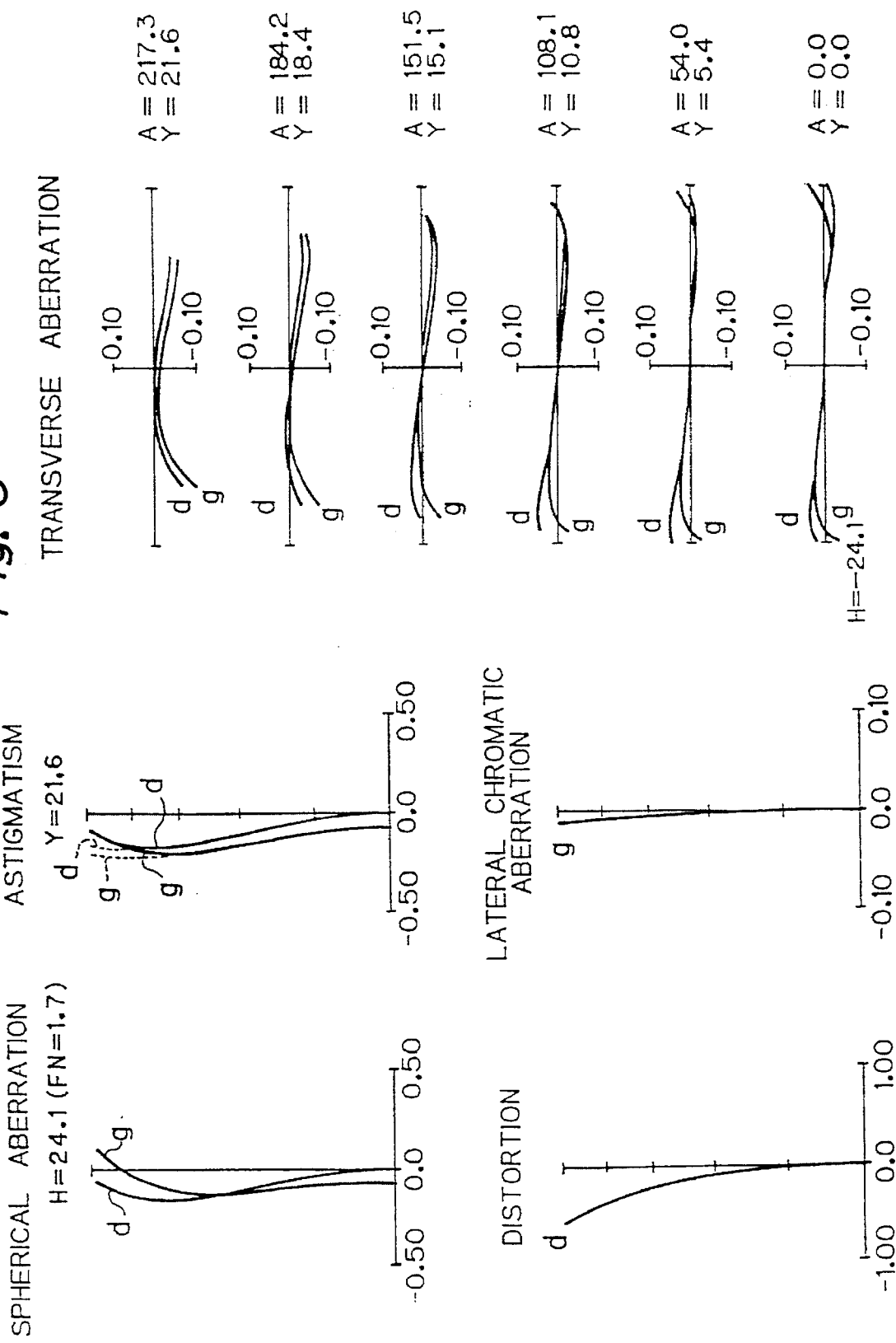
FIG. 3 graphically shows various aberrations when the image magnification is −1/10 in the first embodiment.

FIGS. 2 and 3 graphically show various aberrations at the infinite object point and at the image magnification $\beta=-1/10$, respectively, in the first embodiment. In these figures: FN is the f-number; Y is the image height; H is the height of entering ray (i.e., distance of incidence); A is the incident angle of the chief ray; d is the spectral d-line ($\lambda=587.6$ nm); and g is the spectral g-line ($\lambda=435.6$ nm).

In the graphs showing astigmatism, the solid line represents the sagittal image surface, and the broken line represents the meridional image surface.

It will be understood from these figures that the a large aperture medium telephoto lens system in this embodiment is effectively corrected for various aberrations.

Figure 4:
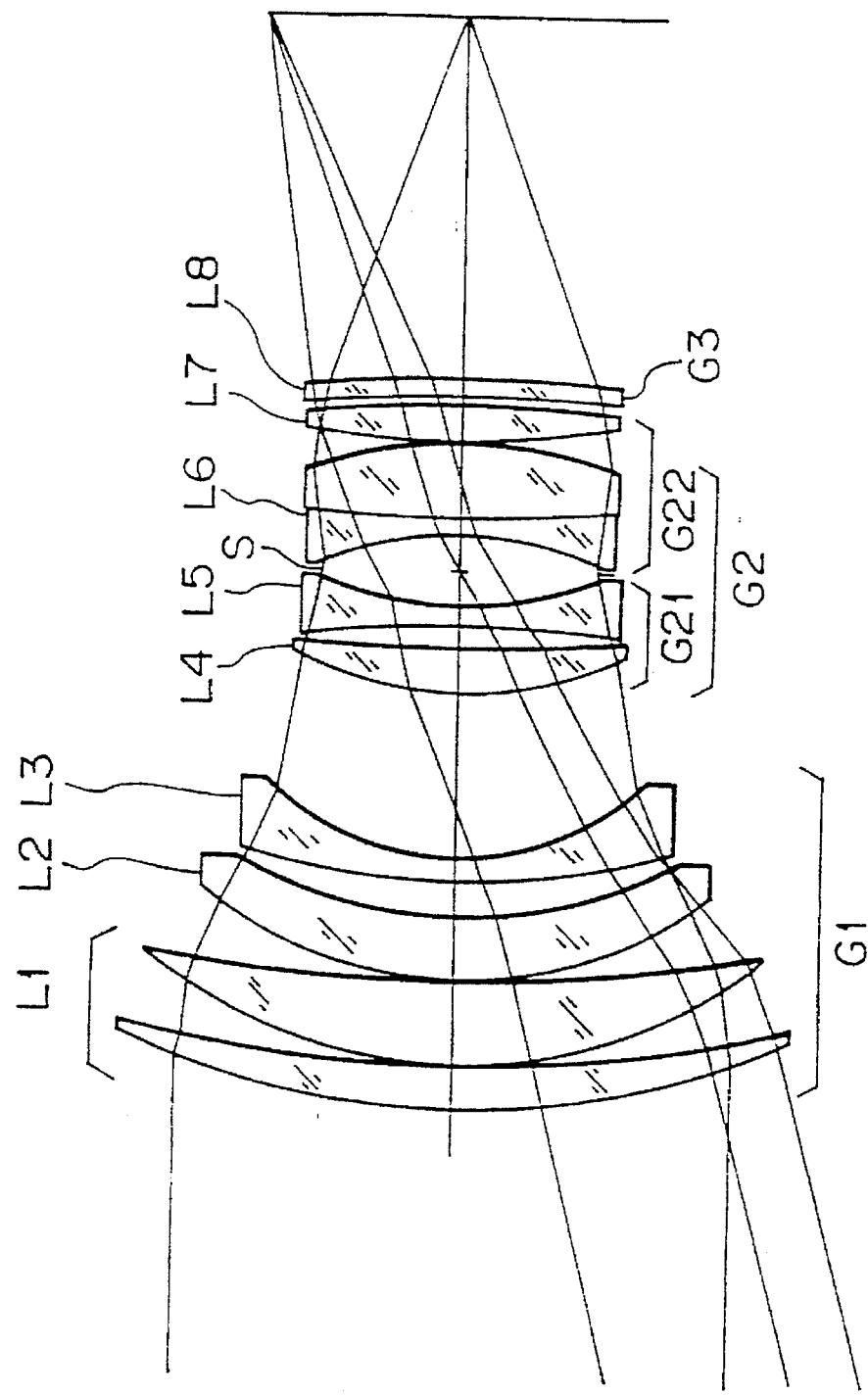
FIG. 4 shows the lens arrangement of a large aperture medium telephoto lens system according to a second embodiment of the present invention.

Second Embodiment:

FIG. 4 shows the lens arrangement of a large aperture medium telephoto lens system according to a second embodiment of the present invention.

As shown in FIG. 4, the a large aperture medium telephoto lens system includes, in order from the object side, a 1-st lens unit G1, a 2-nd lens unit G2, and a 3-rd lens unit G3. The 1-st lens unit G1 includes, in order from the object side, a combination of two positive meniscus lens elements L1 each having a convex surface directed toward the object side, a positive meniscus lens element L2 having a convex surface directed toward the object side, and a negative meniscus lens element L3 having a convex surface directed toward the object side. The 2-nd lens unit G2 includes, in order from the object side, a positive meniscus lens element L4 having a convex surface directed toward the object side, a biconcave lens element L5, an aperture stop S, a cemented lens component L6 of a biconcave lens element and a biconvex lens element, and a biconvex lens element L7. The 3-rd lens unit G3 has a positive meniscus lens element L8 having a concave surface directed toward the object side.

FIG. 4 shows the positional relationship between the lens units when the lens system is focused at the infinite object point. When the lens system is to be focused on an object at the closest focusing distance, the 2-nd lens unit G2 moves on the optical axis along an orbit indicated by the arrow in FIGS. 25(a) and 25(b).

The second embodiment differs from the first embodiment in that the lens element L1 of the a large aperture medium telephoto lens system in the second embodiment is composed of two lens elements.

The table below shows numerical data in the second embodiment of the present invention. In the table: f is the focal length when the lens system is focused at the infinite object point; FN is the f-number at the infinite object point; $\beta$ is the image magnification when the lens system is focused at a near object point; and Bf is the back focus. In addition, the numerals at the left end show the ordinal Nos. of the lens surfaces from the object side, and r is the radius of curvature of each lens surface. d is the spacing between each pair of adjacent lens surfaces, and n and v are respectively the refractive index and the Abbe's number for the spectral d-line ($\lambda=587.6$ nm).

f = 85.00
FN = 1.43
Bf = 38.12

|    | r        | d            | v     | n       |
| -- | -------- | ------------ | ----- | ------- |
| 1  | 82.1305  | 4.6000       | 65.42 | 1.60300 |
| 2  | 142.2969 | 0.1000       |       |         |
| 3  | 50.1028  | 9.6000       | 67.87 | 1.59319 |
| 4  | 180.9466 | 0.1000       |       |         |
| 5  | 43.2464  | 7.0000       | 40.90 | 1.79631 |
| 6  | 50.6525  | 4.0000       |       |         |
| 7  | 85.0525  | 2.4000       | 29.46 | 1.71736 |
| 8  | 29.0685  | (d8 = variable) |    |         |
| 9  | 39.2512  | 4.8000       | 39.61 | 1.80454 |
| 10 | 198.2455 | 2.5000       |       |         |
| 11 | -126.0081| 2.0000       | 32.17 | 1.67270 |
| 12 | 36.9324  | 4.0000       |       |         |
| 13 | ∞        | 4.0000       |       | (stop)  |
| 14 | -36.6878 | 1.8000       | 31.08 | 1.68893 |
| 15 | 158.8503 | 8.0000       | 39.82 | 1.86994 |
| 16 | -46.1165 | 0.1000       |       |         |
| 17 | 84.9089  | 4.0000       | 47.47 | 1.78797 |
| 18 | -151.1095| (d18 = variable) |  |         |
| 19 | -177.6658| 2.0000       | 52.30 | 1.74810 |
| 20 | -150.9493| 38.1199      |       |         |

(Spacings variable during focusing)

| f,β | 85.0000 | -0.1000 |
| --- | ------- | ------- |
| d8  | 17.7992 | 7.4554  |
| d18 | 1.1997  | 11.5435 |

(Values corresponding to conditions)

| (1)  | F1/f    | = 2.290  |
| ---- | ------- | -------- |
| (2)  | F2/f    | = 0.852  |
| (3)  | F3/f    | = 15.296 |
| (4)  | D1/f    | = 0.327  |
| (5)  | S1/f    | = 0.209  |
| (6)  | r1/f    | = 0.966  |
| (7)  | r10/r9  | = -0.293 |
| (8)  | Da/f    | = 0.109  |
| (9)  | Db/f    | = 0.094  |
| (10) | Fa/f    | = -2.692 |
| (11) | Fb/f    | = 0.627  |
| (12) | r3/f    | = 0.509  |
| (13) | r13/r11 | = 1.257  |
| (14) | f/r12   | = 0.535  |
| (15) | v1-v2   | = 24.52  |
| (16) | n7      | = 1.870  |
| (17) | v8-v4   | = 7.86   |
| (18) | r17/r16 | = 0.850  |

Figure 5:
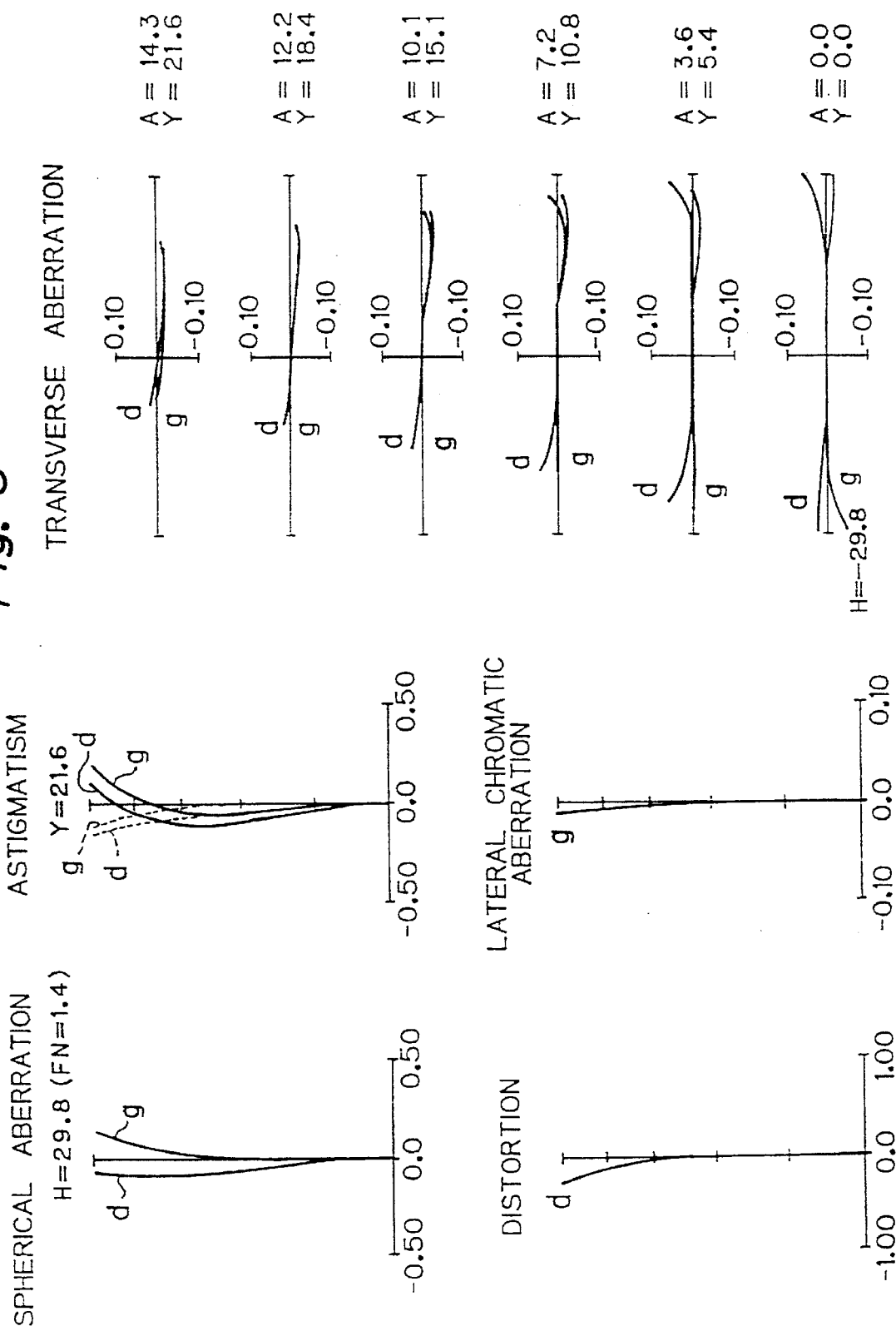
FIG. 5 graphically shows various aberrations when the lens system is focused at the infinite object point in the second embodiment.
Figure 6:
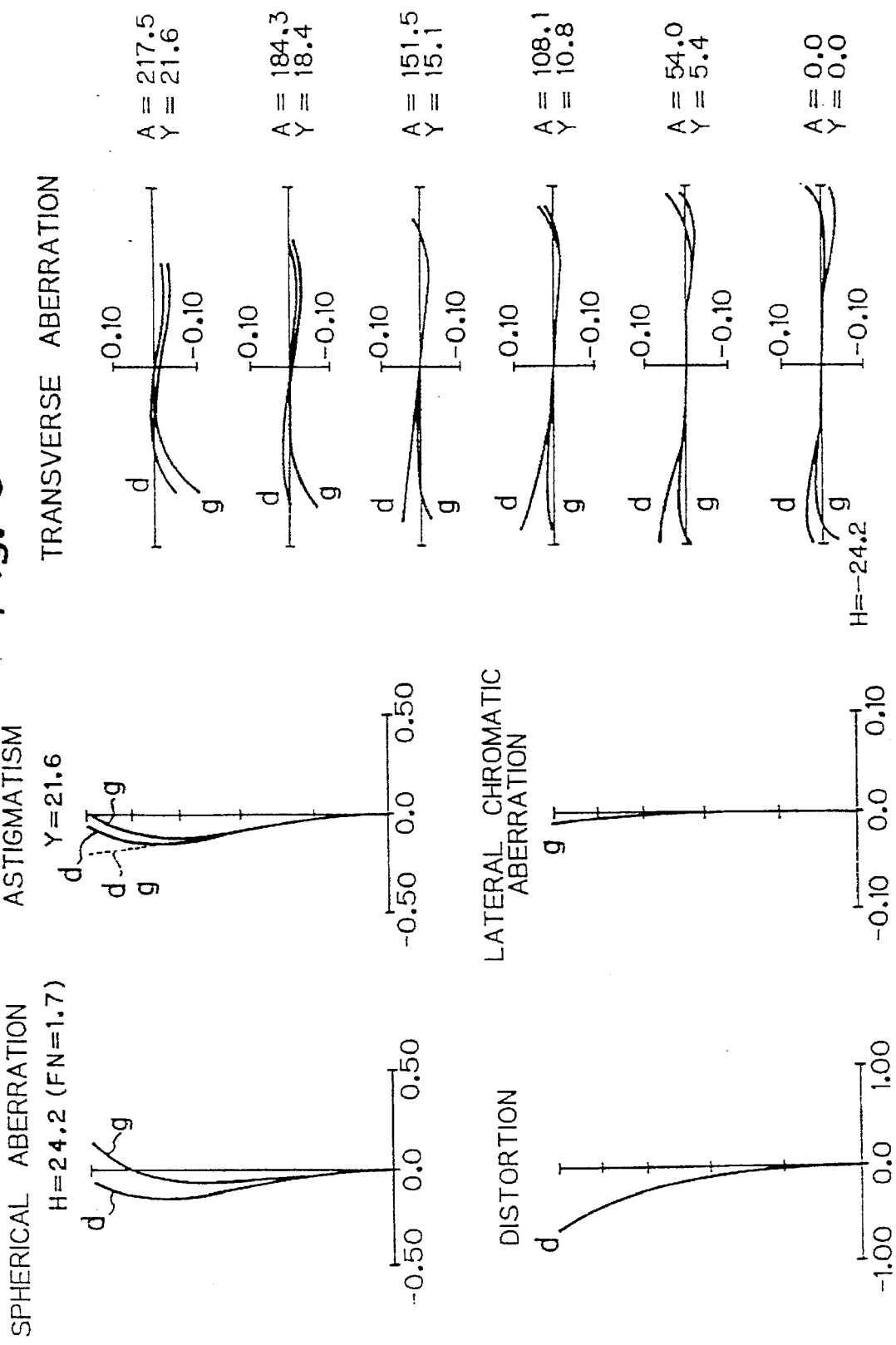
FIG. 6 graphically shows various aberrations when the image magnification is −1/10 in the second embodiment.

FIGS. 5 and 6 graphically show various aberrations at the infinite object point and at the image magnification $\beta=-1/10$, respectively, in the second embodiment. In these figures: FN is the f-number; Y is the image height; H is the height of entering ray; A is the incident angle of the chief ray; d is the spectral d-line ($\lambda=587.6$ nm); and g is the spectral g-line ($\lambda=435.6$ nm).

In the graphs showing astigmatism, the solid line represents the sagittal image surface, and the broken line represents the meridional image surface.

It will be understood from these figures that the a large aperture medium telephoto lens system in this embodiment is effectively corrected for various aberrations.

Figure 7:
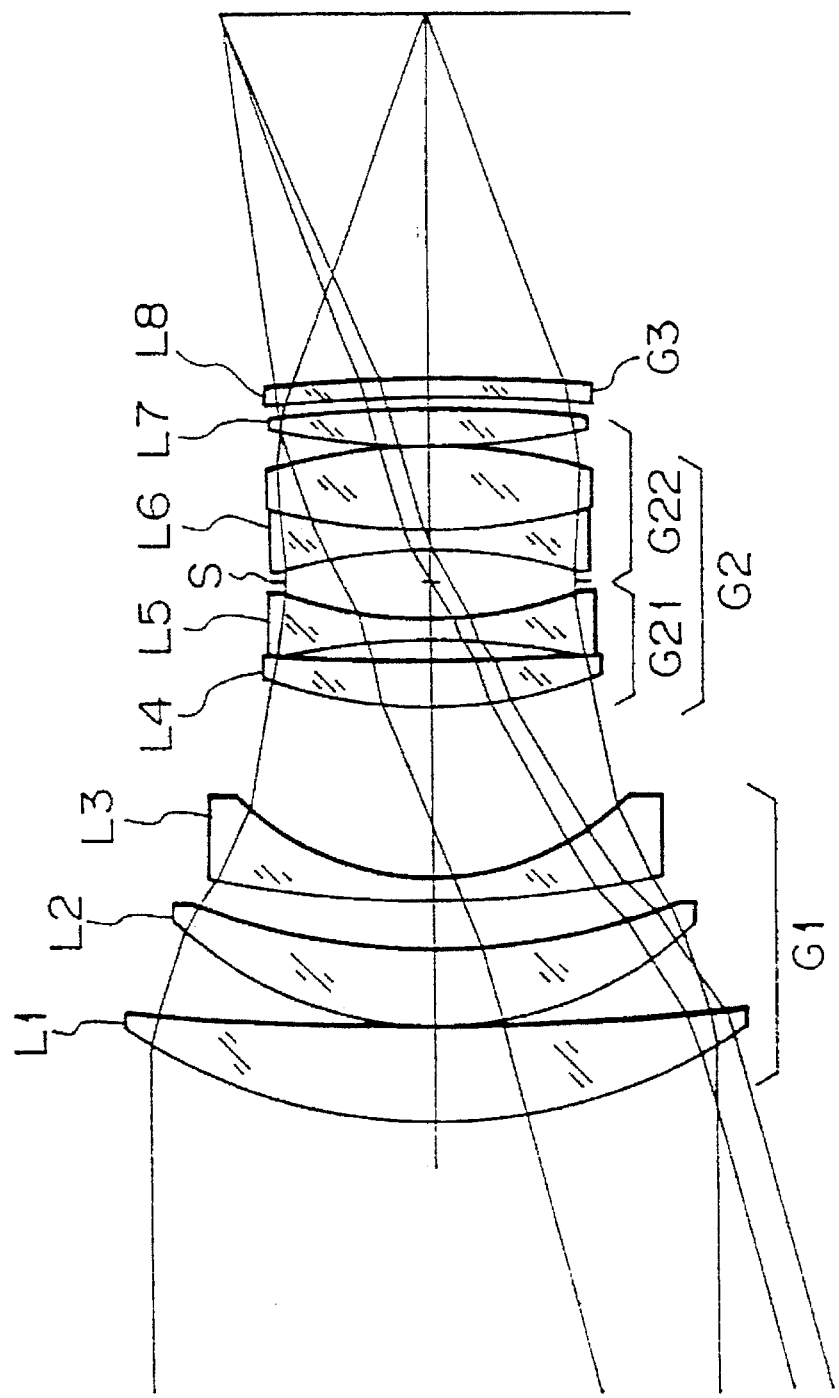
FIG. 7 shows the lens arrangement of a large aperture medium telephoto lens system according to a third embodiment of the present invention.

Third Embodiment:

FIG. 7 shows the lens arrangement of a large aperture medium telephoto lens system according to a third embodiment of the present invention.

As shown in FIG. 7, the a large aperture medium telephoto lens system includes, in order from the object side, a 1-st lens unit G1, a 2-nd lens unit G2, and a 3-rd lens unit G3. The 1-st lens unit G1 includes, in order from the object side, a positive meniscus lens element L1 having a convex surface directed toward the object side, a positive meniscus lens element L2 having a convex surface directed toward the object side, and a negative meniscus lens element L3 having a convex surface directed toward the object side. The 2-nd lens unit G2 includes, in order from the object side, a positive meniscus lens element L4 having a convex surface directed toward the object side, a biconcave lens element L5, an aperture stop S, a cemented lens component L6 of a biconcave lens element and a biconvex lens element, and a biconvex lens element L7. The 3-rd lens unit G3 has a positive meniscus lens element L8 having a concave surface directed toward the object side.

FIG. 7 shows the positional relationship between the lens units when the lens system is focused at the infinite object point. When the lens system is to be focused on an object at the closest focusing distance, the 2-nd lens unit G2 moves on the optical axis along an orbit indicated by the arrow in FIGS. 25(a) and 25(b).

The a large aperture medium telephoto lens system of the third embodiment has the same arrangement as that of the first embodiment but differs from the lens system of the first embodiment in the configuration of each lens unit.

The table below shows numerical data in the third embodiment of the present invention. In the table: f is the focal length when the lens system is focused at the infinite object point; FN is the f-number at the infinite object point; β is the image magnification when the lens system is focused at a near object point; and Bf is the back focus. In addition, the numerals at the left end show the ordinal Nos. of the lens surfaces from the object side, and r is the radius of curvature of each lens surface. d is the spacing between each pair of adjacent lens surfaces, and n and v are respectively the refractive index and the Abbe's number for the spectral d-line (λ=587.6 nm).

f = 85.00
FN = 1.43
Bf = 38.12

| | r | d | v | n |
|---|---|---|---|---|
| 1 | 55.9840 | 10.6000 | 65.42 | 1.60300 |
| 2 | 404.1220 | 0.2000 | | |
| 3 | 41.0180 | 7.9000 | 46.55 | 1.80411 |
| 4 | 70.9270 | 4.8000 | | |
| 5 | 105.3240 | 2.4000 | 29.46 | 1.71736 |
| 6 | 27.9470 | (d6 = variable) | | |
| 7 | 48.4100 | 5.0000 | 39.61 | 1.80454 |
| 8 | 238.0767 | 2.3000 | | |
| 9 | −79.2380 | 2.2000 | 33.75 | 1.64831 |
| 10 | 45.3310 | 4.0000 | | |
| 11 | ∞ | 3.4000 | (stop) | |
| 12 | −53.7640 | 2.0000 | 32.17 | 1.67270 |
| 13 | 63.9390 | 9.0000 | 39.82 | 1.86994 |
| 14 | −58.1120 | 0.2000 | | |
| 15 | 96.3900 | 3.6000 | 47.47 | 1.78797 |
| 16 | −174.7209 | (d16 = variable) | | |
| 17 | −295.5080 | 2.0000 | 49.45 | 1.77279 |
| 18 | −214.2780 | 38.1155 | | | f = 85.00
FN = 1.43
Bf = 38.12

(Spacings variable during focusing)

| f,β | 84.9991 | −0.1000 |
|---|---|---|
| d6 | 18.2980 | 7.1690 |
| d16 | 1.0980 | 12.2270 |

(Values corresponding to conditions)

| (1) | F1/f | = 2.059 |
|---|---|---|
| (2) | F2/f | = 0.890 |
| (3) | F3/f | = 11.742 |
| (4) | D1/f | = 0.304 |
| (5) | S1/f | = 0.215 |
| (6) | r1/f | = 0.659 |
| (7) | r10/r9 | = −0.572 |
| (8) | Da/f | = 0.112 |
| (9) | Db/f | = 0.087 |
| (10) | Fa/f | = −1.623 |
| (11) | Fb/f | = 0.595 |
| (12) | r3/f | = 0.483 |
| (13) | r13/r11 | = 1.081 |
| (14) | f/r12 | = 1.329 |
| (15) | v1−v2 | = 18.87 |
| (16) | n7 | = 1.870 |
| (17) | v8−v4 | = 7.86 |
| (18) | r17/r16 | = 0.725 |

Figure 8:
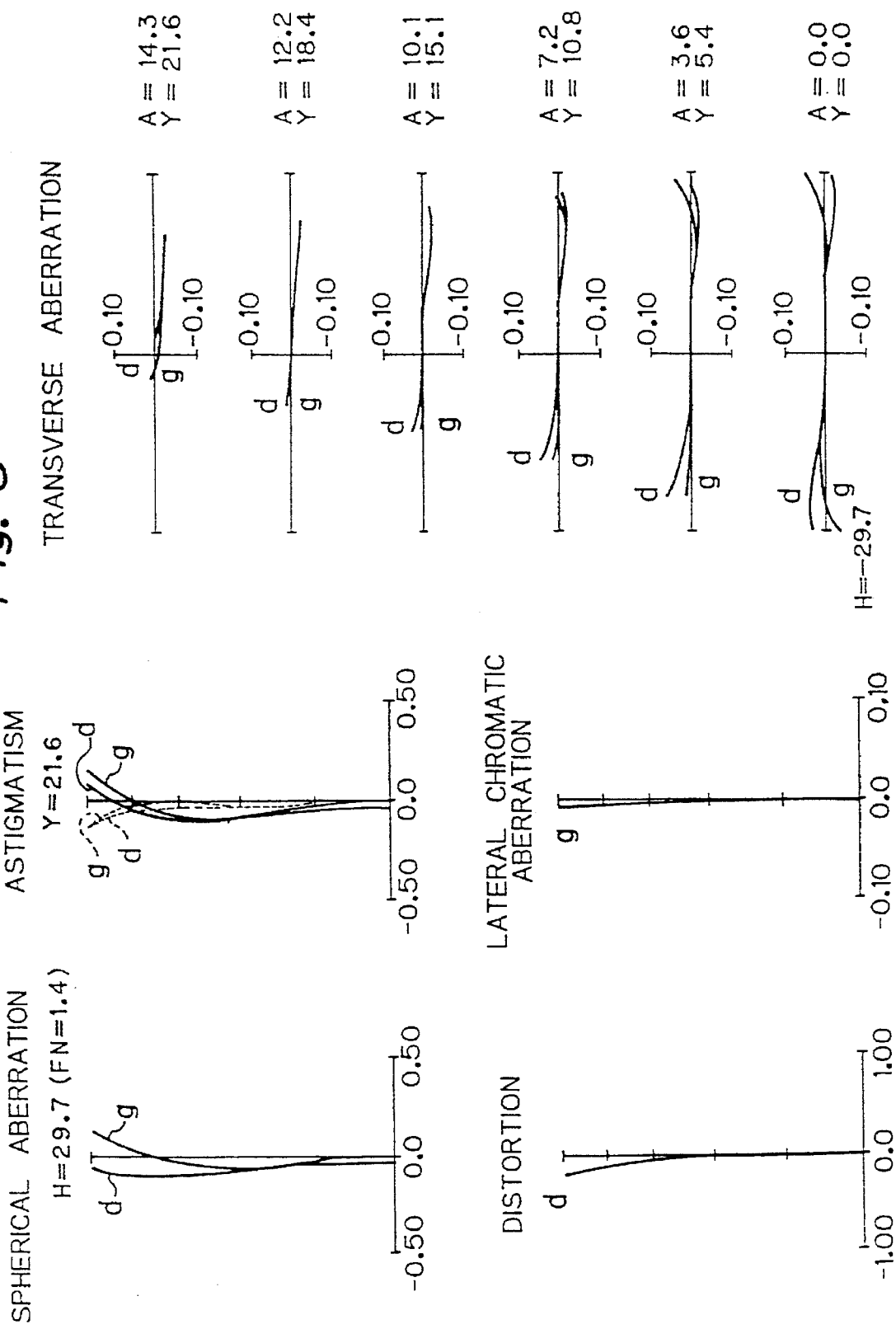
FIG. 8 graphically shows various aberrations when the lens system is focused at the infinite object point in the third embodiment.
Figure 9:
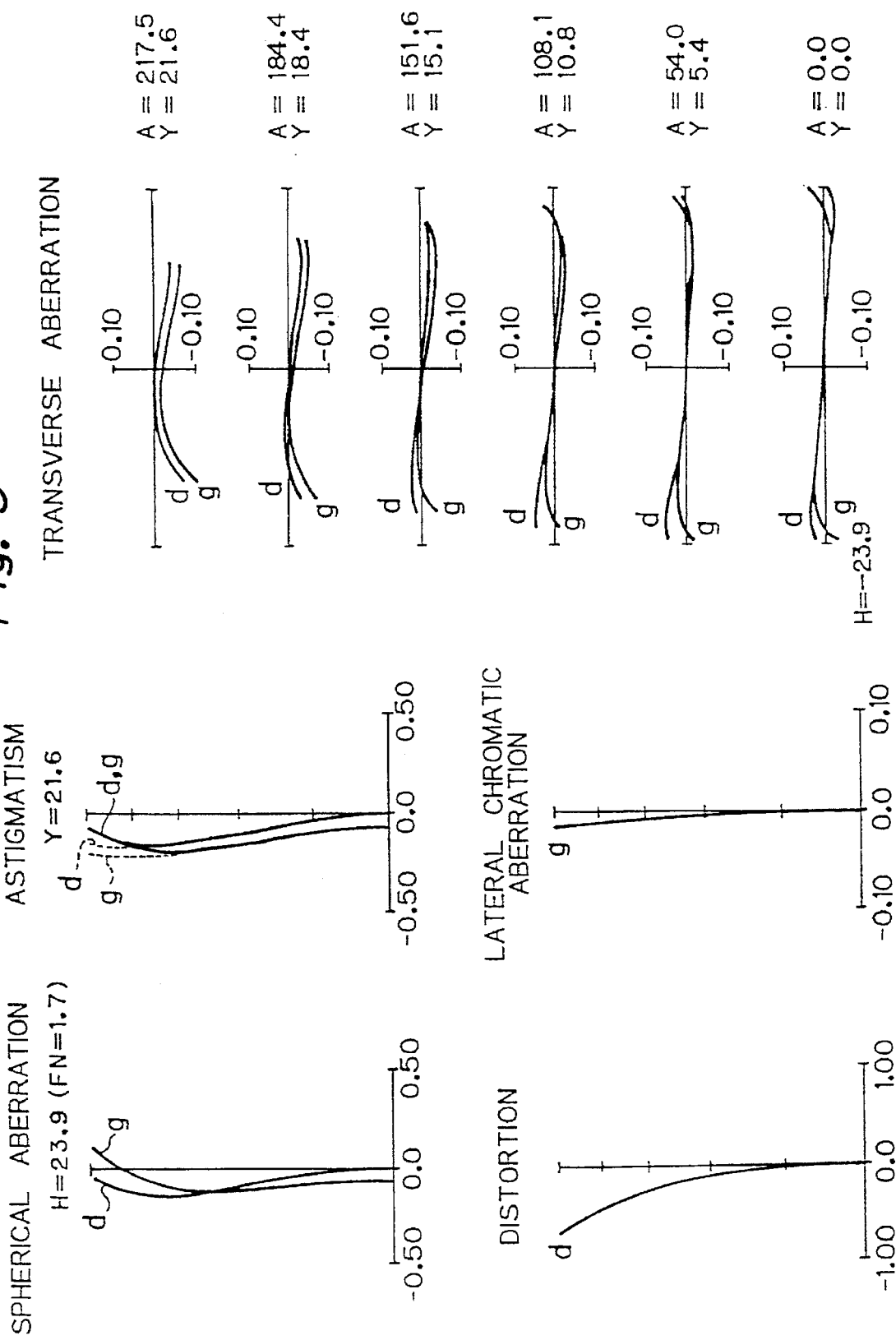
FIG. 9 graphically shows various aberrations when the image magnification is −1/10 in the third embodiment.

FIGS. 8 and 9 graphically show various aberrations at the infinite object point and at the image magnification β=−1/10, respectively, in the third embodiment. In these figures: FN is the f-number; Y is the image height; H is the height of entering ray; A is the incident angle of the chief ray; d is the spectral d-line (λ=587.6 nm); and g is the spectral g-line (λ=435.6 nm).

In the graphs showing astigmatism, the solid line represents the sagittal image surface, and the broken line represents the meridional image surface.

It will be understood from these figures that the a large aperture medium telephoto lens system in this embodiment is effectively corrected for various aberrations.

Figure 10:
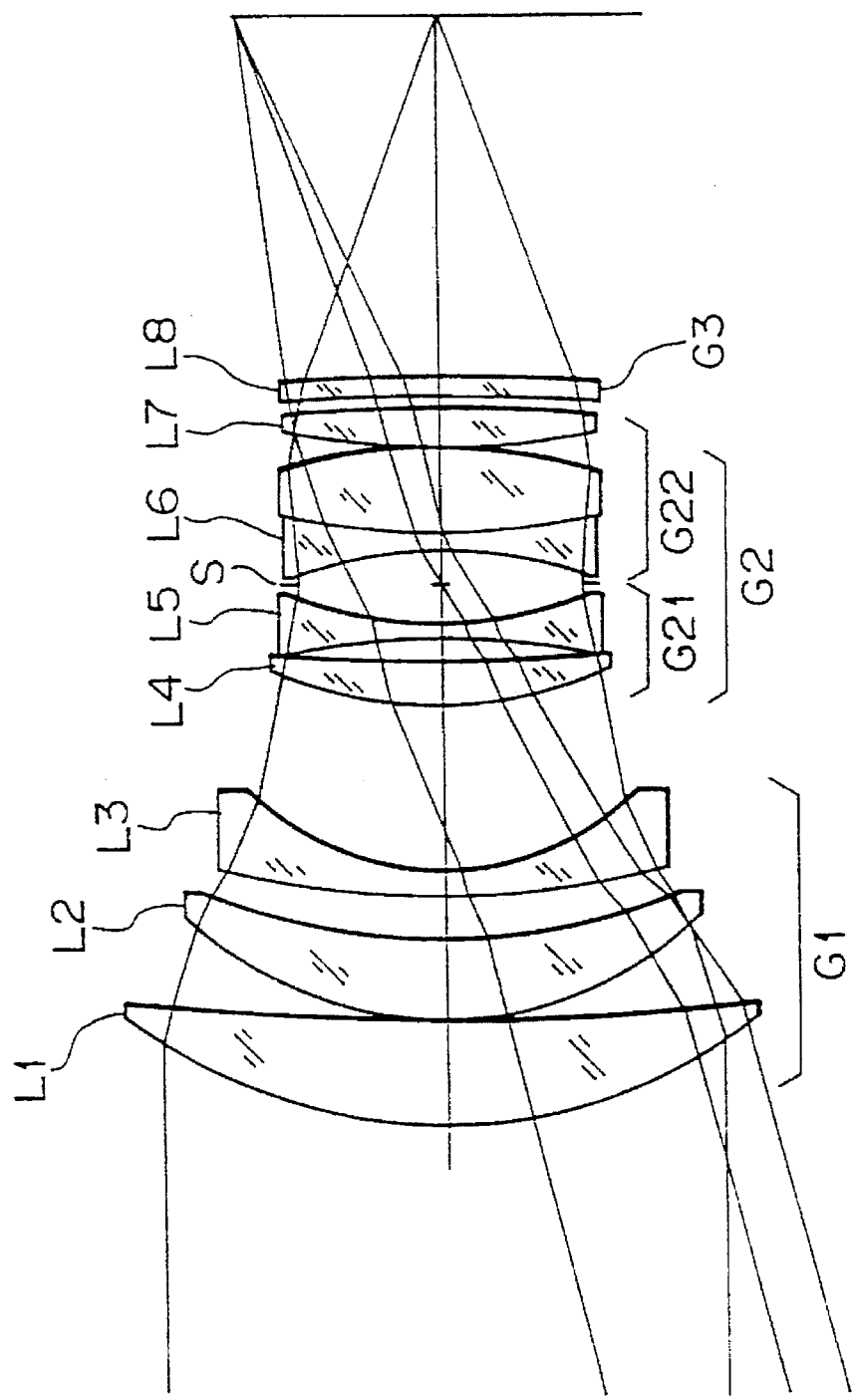
FIG. 10 shows the lens arrangement of a large aperture medium telephoto lens system according to a fourth embodiment of the present invention.

Fourth Embodiment:

FIG. 10 shows the lens arrangement of a large aperture medium telephoto lens system according to a fourth embodiment of the present invention.

As shown in FIG. 10, the a large aperture medium telephoto lens system includes, in order from the object side, a 1-st lens unit G1, a 2-nd lens unit G2, and a 3-rd lens unit G3. The 1-st lens unit G1 includes, in order from the object side, a positive meniscus lens element L1 having a convex surface directed toward the object side, a positive meniscus lens element L2 having a convex surface directed toward the object side, and a negative meniscus lens element L3 having a convex surface directed toward the object side. The 2-nd lens unit G2 includes, in order from the object side, a positive meniscus lens element L4 having a convex surface directed toward the object side, a biconcave lens element L5, an aperture stop S, a cemented lens component L6 of a biconcave lens element and a biconvex lens element, and a biconvex lens element L7. The 3-rd lens unit G3 has a positive meniscus lens element L8 having a concave surface directed toward the object side.

FIG. 10 shows the positional relationship between the lens units when the lens system is focused at the infinite object point. When the lens system is to be focused on an object at the closest focusing distance, the 2-nd lens unit G2 moves on the optical axis along an orbit indicated by the arrow in FIGS. 25(a) and 25(b).

The a large aperture medium telephoto lens system of the fourth embodiment has the same arrangement as that of the first embodiment but differs from the lens system of the first embodiment in the configuration of each lens unit.

The table below shows numerical data in the fourth embodiment of the present invention. In the table: f is the focal length when the lens system is focused at the infinite object point; FN is the f-number at the infinite object point; $\beta$ is the image magnification when the lens system is focused at a near object point; and Bf is the back focus. In addition, the numerals at the left end show the ordinal Nos. of the lens surfaces from the object side, and r is the radius of curvature of each lens surface. d is the spacing between each pair of adjacent lens surfaces, and n and v are respectively the refractive index and the Abbe's number for the spectral d-line ($\lambda$=587.6 nm).

f = 85.00
FN = 1.43
Bf = 38.12

|    | r         | d             | v      | n       |
|----|-----------|---------------|--------|---------|
| 1  | 56.1186   | 11.0000       | 65.42  | 1.60300 |
| 2  | 373.2313  | 0.1000        |        |         |
| 3  | 41.4030   | 8.1000        | 46.55  | 1.80411 |
| 4  | 68.8270   | 4.6500        |        |         |
| 5  | 102.4853  | 2.4000        | 29.46  | 1.71736 |
| 6  | 28.4811   | (d6 = variable) |      |         |
| 7  | 43.8059   | 4.7000        | 40.90  | 1.79631 |
| 8  | 219.1563  | 2.4500        |        |         |
| 9  | −95.3469  | 1.8000        | 33.75  | 1.64831 |
| 10 | 41.2488   | 4.2000        |        |         |
| 11 | ∞         | 3.6000        | (stop) |         |
| 12 | −47.7389  | 1.9000        | 32.17  | 1.67270 |
| 13 | 75.2626   | 9.1000        | 39.82  | 1.86994 |
| 14 | −55.7112  | 0.1000        |        |         |
| 15 | 92.9367   | 4.0000        | 47.47  | 1.78797 |
| 16 | −180.9529 | (d16 = variable) |    |         |
| 17 | −299.1767 | 2.0000        | 49.45  | 1.77279 |
| 18 | −226.3008 | 38.1197       |        |         |

(Spacings variable during focusing)

| f,β | 85.0002 | −0.1000 |
|-----|---------|---------|
| d6  | 17.7998 | 6.9879  |
| d16 | 1.0995  | 11.9115 |

(Values corresponding to conditions)

| (1)  | F1/f    | = 2.122  |
| (2)  | F2/f    | = 0.885  |
| (3)  | F3/f    | = 13.976 |
| (4)  | D1/f    | = 0.309  |
| (5)  | S1/f    | = 0.209  |
| (6)  | r1/f    | = 0.660  |
| (7)  | r10/r9  | = −0.433 |
| (8)  | Da/f    | = 0.105  |
| (9)  | Db/f    | = 0.092  |
| (10) | Fa/f    | = −2.039 |
| (11) | Fb/f    | = 0.622  |
| (12) | r3/f    | = 0.487  |
| (13) | r13/r11 | = 1.167  |
| (14) | f/r12   | = 1.129  |
| (15) | v1−v2   | = 18.87  |
| (16) | n7      | = 1.870  |
| (17) | v8−v4   | = 6.57   |
| (18) | r17/r16 | = 0.756  |

Figure 11:
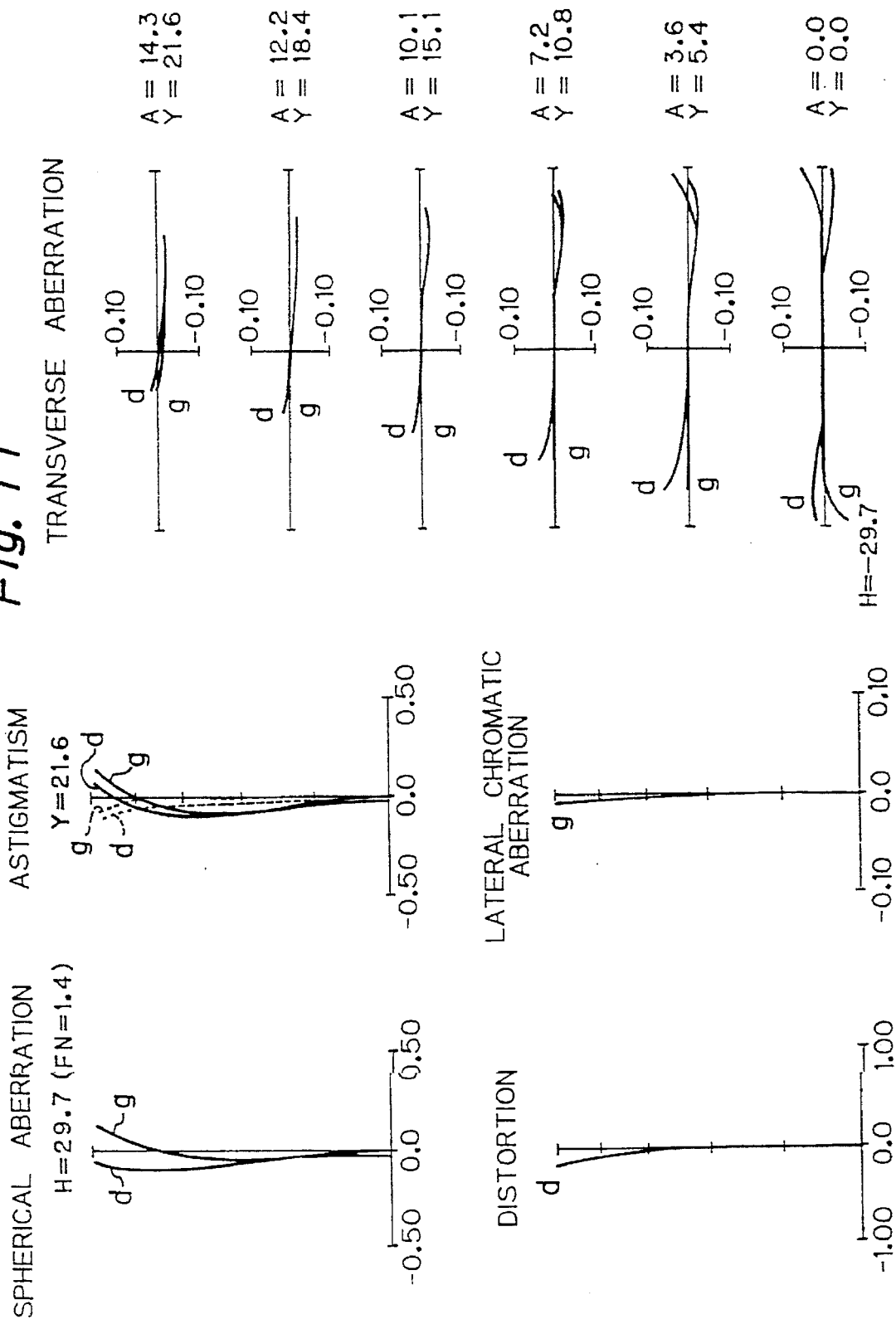
FIG. 11 graphically shows various aberrations when the lens system is focused at the infinite object point in the fourth embodiment.
Figure 12:
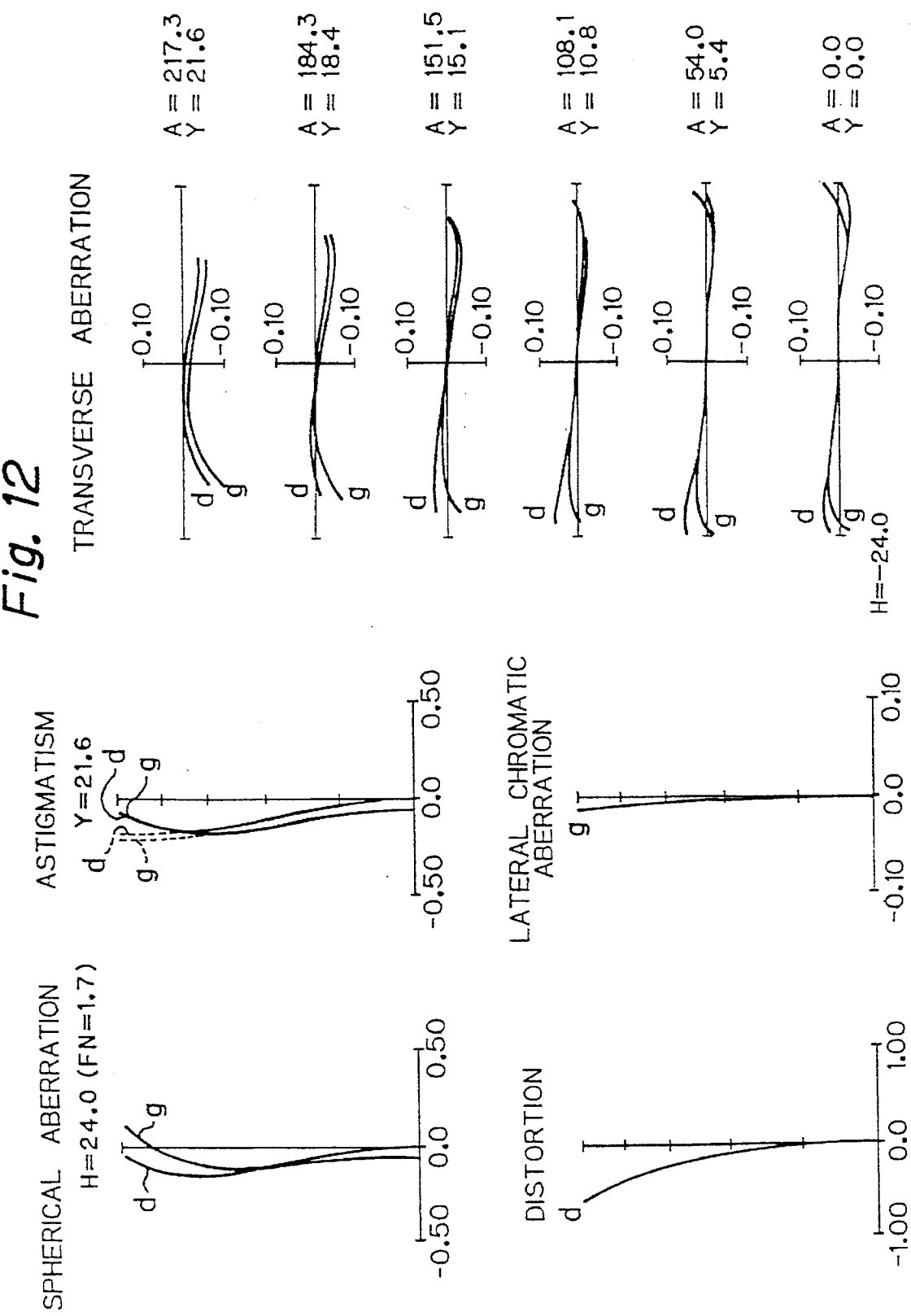
FIG. 12 graphically shows various aberrations when the image magnification is −1/10 in the fourth embodiment.

FIGS. 11 and 12 graphically show various aberrations at the infinite object point and at the image magnification $\beta=-1/10$, respectively, in the fourth embodiment. In these figures: FN is the f-number; Y is the image height; H is the height of entering ray; A is the incident angle of the chief ray; d is the spectral d-line ($\lambda$=587.6 nm); and g is the spectral g-line ($\lambda$=435.6 nm).

In the graphs showing astigmatism, the solid line represents the sagittal image surface, and the broken line represents the meridional image surface.

It will be understood from these figures that the a large aperture medium telephoto lens system in this embodiment is effectively corrected for various aberrations.

Figure 13:
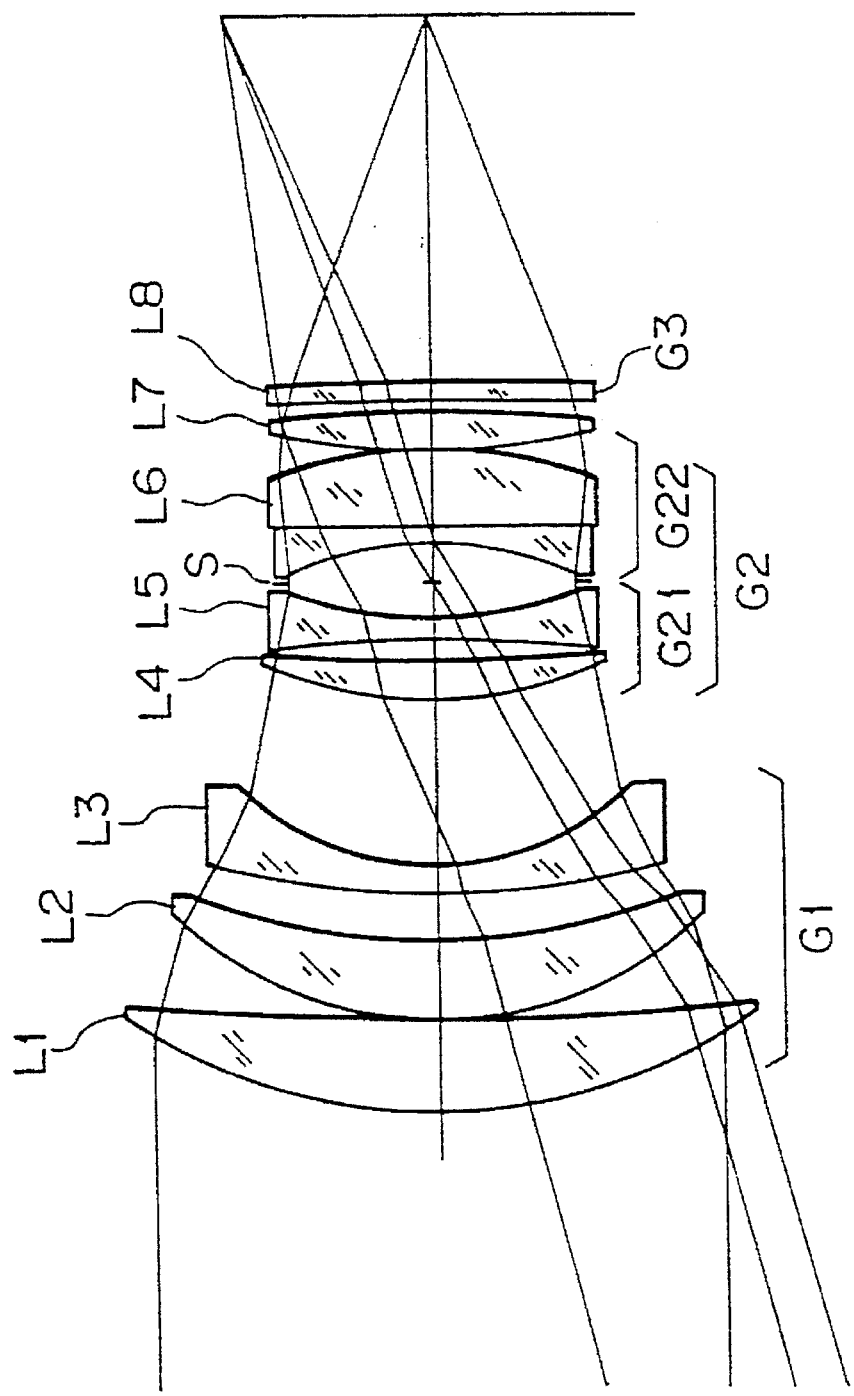
FIG. 13 shows the lens arrangement of a large aperture medium telephoto lens system according to a fifth embodiment of the present invention.

Fifth Embodiment:

FIG. 13 shows the lens arrangement of a large aperture medium telephoto lens system according to a fifth embodiment of the present invention.

As shown in FIG. 13, the a large aperture medium telephoto lens system includes, in order from the object side, a 1-st lens unit G1, a 2-nd lens unit G2, and a 3-rd lens unit G3. The 1-st lens unit G1 includes, in order from the object side, a positive meniscus lens element L1 having a convex surface directed toward the object side, a positive meniscus lens element L2 having a convex surface directed toward the object side, and a negative meniscus lens element L3 having a convex surface directed toward the object side. The 2-nd lens unit G2 includes, in order from the object side, a positive meniscus lens element L4 having a convex surface directed toward the object side, a biconcave lens element L5, an aperture stop S, a cemented lens component L6 of a biconcave lens element and a biconvex lens element, and a biconvex lens element L7. The 3-rd lens unit G3 has a positive meniscus lens element L8 having a concave surface directed toward the object side.

FIG. 13 shows the positional relationship between the lens units when the lens system is focused at the infinite object point. When the lens system is to be focused on an object at the closest focusing distance, the 2-nd lens unit G2 moves on the optical axis along an orbit indicated by the arrow in FIGS. 25(a) and 25(b).

The a large aperture medium telephoto lens system of the fifth embodiment has the same arrangement as that of the first embodiment but differs from the lens system of the first embodiment in the configuration of each lens unit.

The table below shows numerical data in the fifth embodiment of the present invention. In the table: f is the focal length when the lens system is focused at the infinite object point; FN is the f-number at the infinite object point; $\beta$ is the image magnification when the lens system is focused at a near object point; and Bf is the back focus. In addition, the numerals at the left end show the ordinal Nos. of the lens surfaces from the object side, and r is the radius of curvature of each lens surface. d is the spacing between each pair of adjacent lens surfaces, and n and v are respectively the refractive index and the Abbe's number for the spectral d-line ($\lambda$=587.6 nm).

f = 85.00
FN = 1.43
Bf = 38.12

|    | r         | d             | v      | n       |
|----|-----------|---------------|--------|---------|
| 1  | 55.1738   | 10.0000       | 67.87  | 1.59319 |
| 2  | 335.3856  | 0.1000        |        |         |
| 3  | 41.1905   | 8.1000        | 46.55  | 1.80411 |
| 4  | 71.8141   | 4.9000        |        |         |
| 5  | 100.7687  | 2.4000        | 29.46  | 1.71736 |
| 6  | 27.8403   | (d6 = variable) |      |         |
| 7  | 40.7318   | 4.2000        | 39.61  | 1.80454 |
| 8  | 164.1010  | 2.5000        |        |         |
| 9  | −130.6560 | 2.0000        | 32.17  | 1.67270 |
| 10 | 39.6258   | 4.0000        |        |         |
| 11 | ∞         | 4.0000        | (stop) |         |
| 12 | −37.1581  | 1.8000        | 31.08  | 1.68893 |
| 13 | 924.5430  | 8.0000        | 39.82  | 1.86994 |
| 14 | −46.3606  | 0.1000        |        |         |
| 15 | 82.0387   | 4.0000        | 47.47  | 1.78797 |
| 16 | −151.2042 | (d16 = variable) |    |         |
| 17 | −469.5733 | 2.0000        | 52.30  | 1.74810 |
| 18 | −317.2566 | 38.1201       |        |         |

-continued f = 85.00
FN = 1.43
Bf = 38.12

(Spacings variable during focusing)

| f,β | 85.0006 | −0.1000 |
|---|---|---|
| d6 | 17.7991 | 6.9406 |
| d16 | 1.2000 | 12.0585 |

(Values corresponding to conditions)

| (1) | F1/f | = 2.083 |
|---|---|---|
| (2) | F2/f | = 0.883 |
| (3) | F3/f | = 15.295 |
| (4) | D1/f | = 0.300 |
| (5) | S1/f | = 0.209 |
| (6) | r1/f | = 0.649 |
| (7) | r10/r9 | = −0.303 |
| (8) | Da/f | = 0.102 |
| (9) | Db/f | = 0.094 |
| (10) | Fa/f | = −2.358 |
| (11) | Fb/f | = 0.640 |
| (12) | r3/f | = 0.485 |
| (13) | r13/r11 | = 1.248 |
| (14) | f/r12 | = 0.092 |
| (15) | v1−v2 | = 21.32 |
| (16) | n7 | = 1.870 |
| (17) | v8−v4 | = 7.86 |
| (18) | r17/r16 | = 0.676 |

Figure 14:
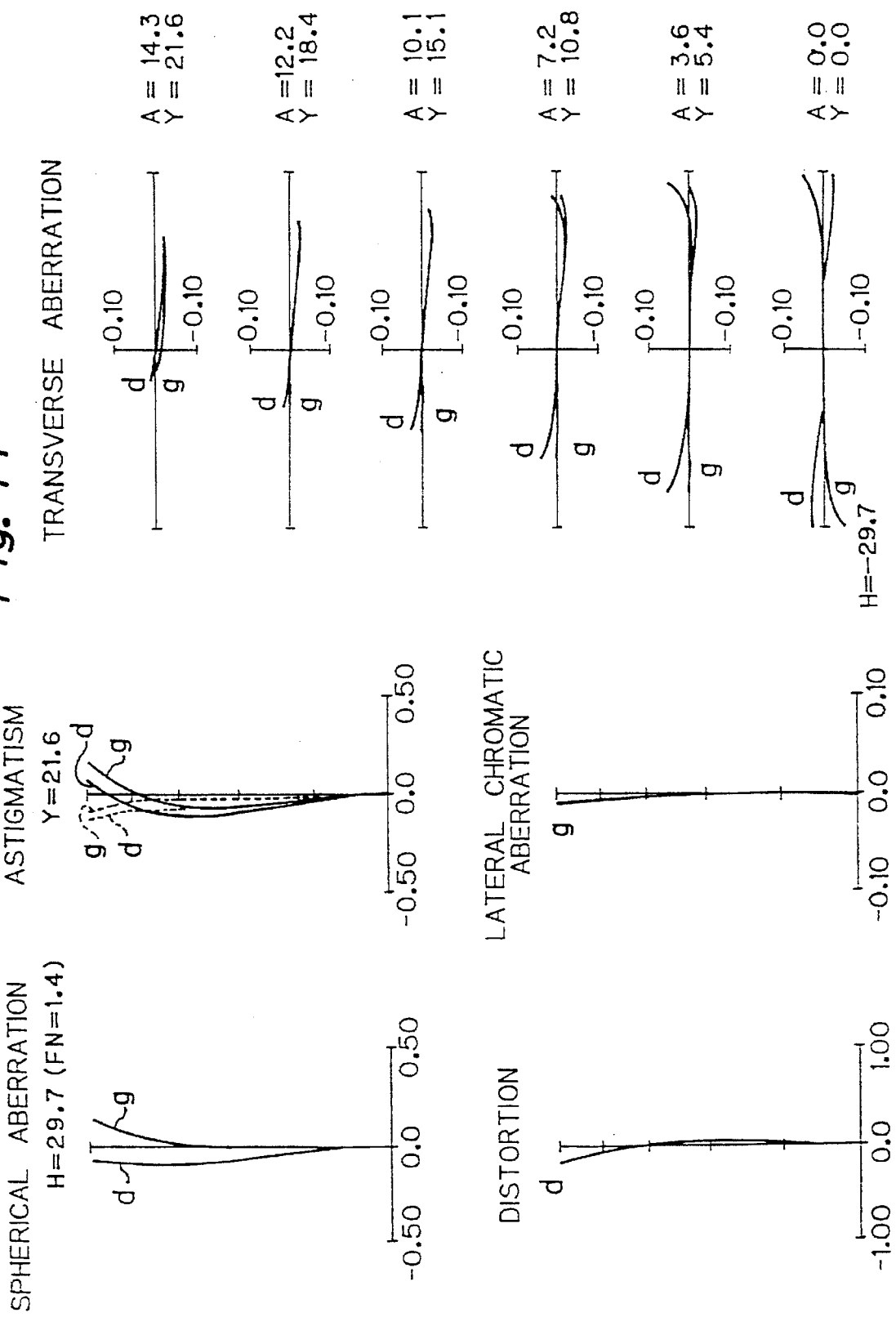
FIG. 14 graphically shows various aberrations when the lens system is focused at the infinite object point in the fifth embodiment.
Figure 15:
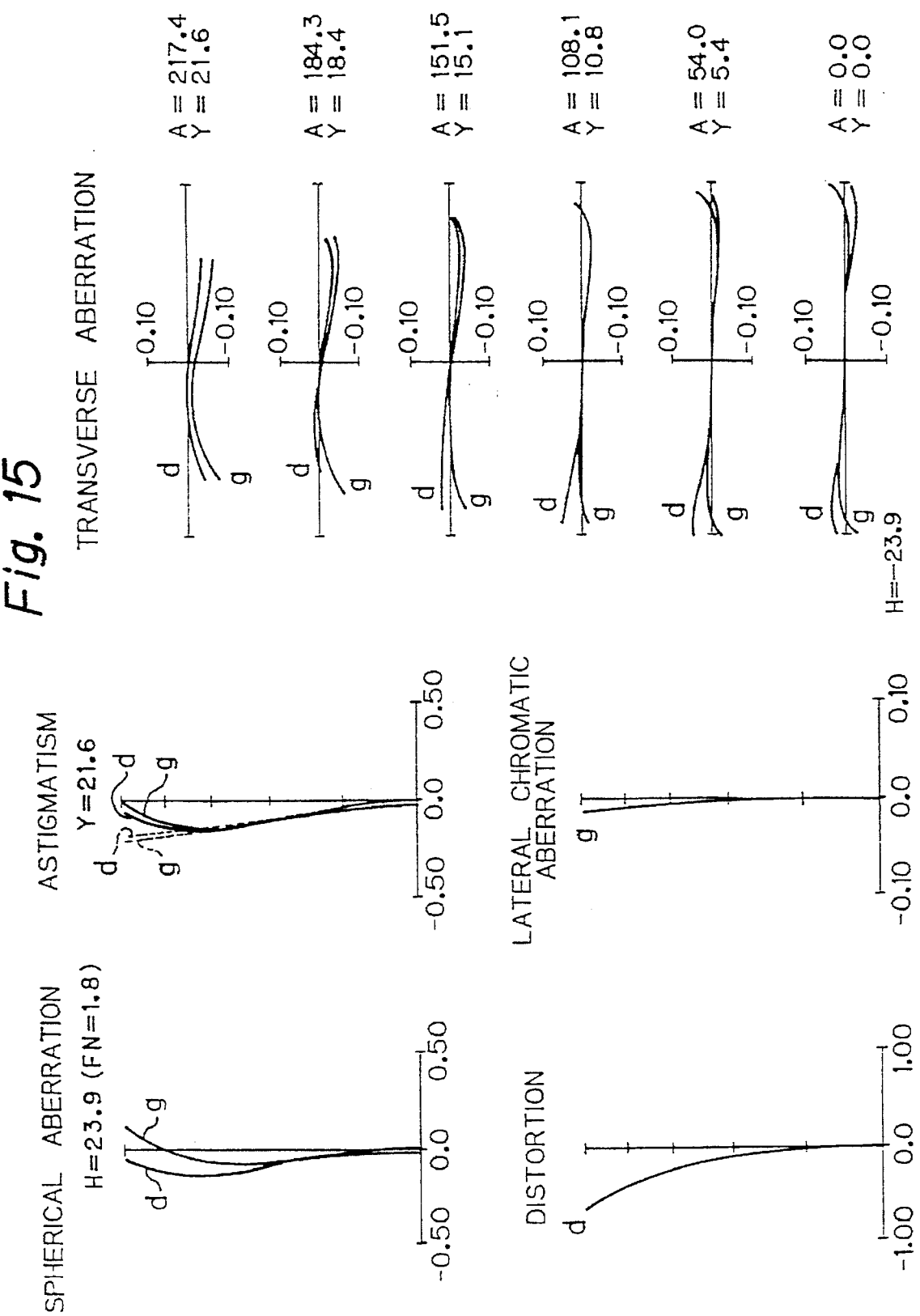
FIG. 15 graphically shows various aberrations when the image magnification is −1/10 in the fifth embodiment.

FIGS. 14 and 15 graphically show various aberrations at the infinite object point and at the image magnification β=−1/10, respectively, in the fifth embodiment. In these figures: FN is the f-number; Y is the image height; H is the height of entering ray; A is the incident angle of the chief ray; d is the spectral d-line (λ=587.6 nm); and g is the spectral g-line (λ=435.6 nm).

In the graphs showing astigmatism, the solid line represents the sagittal image surface, and the broken line represents the meridional image surface.

It will be understood from these figures that the a large aperture medium telephoto lens system in this embodiment is effectively corrected for various aberrations.

Figure 16:
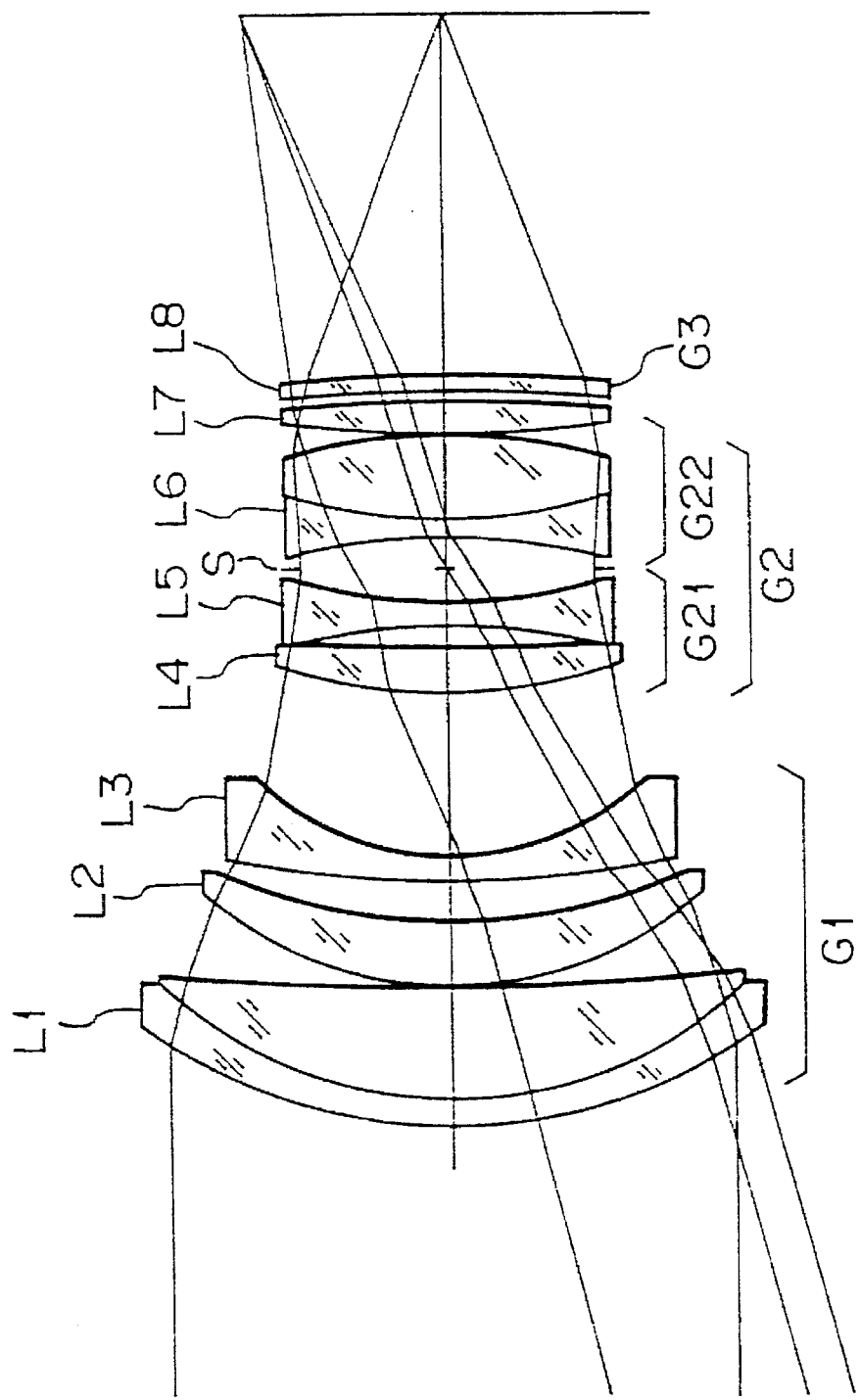
FIG. 16 shows the lens arrangement of a large aperture medium telephoto lens system according to a sixth embodiment of the present invention.

Sixth Embodiment:

FIG. 16 shows the lens arrangement of a large aperture medium telephoto lens system according to a sixth embodiment of the present invention.

As shown in FIG. 16, the a large aperture medium telephoto lens system includes, in order from the object side, a 1-st lens unit G1, a 2-nd lens unit G2, and a 3-rd lens unit G3. The 1-st lens unit G1 includes, in order from the object side, a cemented positive lens component L1, which is composed of a negative meniscus lens element having a convex surface directed toward the object side, and a positive meniscus lens element having a convex surface directed toward the object side, a positive meniscus lens element L2 having a convex surface directed toward the object side, and a negative meniscus lens element L3 having a convex surface directed toward the object side. The 2-nd lens unit G2 includes, in order from the object side, a positive meniscus lens element L4 having a convex surface directed toward the object side, a biconcave lens element L5, an aperture stop S, a cemented lens component L6 of a biconcave lens element and a biconvex lens element, and a biconvex lens element L7. The 3-rd lens unit G3 has a positive meniscus lens element L8 having a concave surface directed toward the object side.

FIG. 16 shows the positional relationship between the lens units when the lens system is focused at the infinite object point. When the lens system is to be focused on an object at the closest focusing distance, the 2-nd lens unit G2 moves on the optical axis along an orbit indicated by the arrow in FIGS. 25(a) and 25(b).

In the a large aperture medium telephoto lens system of the sixth embodiment, the lens component L1 is a cemented lens which is composed of a negative lens element and a positive lens element.

The table below shows numerical data in the sixth embodiment of the present invention. In the table: f is the focal length when the lens system is focused at the infinite object point; FN is the f-number at the infinite object point; β is the image magnification when the lens system is focused at a near object point; and Bf is the back focus. In addition, the numerals at the left end show the ordinal Nos. of the lens surfaces from the object side, and r is the radius of curvature of each lens surface. d is the spacing between each pair of adjacent lens surfaces, and n and v are respectively the refractive index and the Abbe's number for the spectral d-line (λ=587.6 nm).

f = 85.00
FN = 1.43
Bf = 38.12

| | r | d | v | n |
|---|---|---|---|---|
| 1 | 54.1623 | 3.0000 | 35.19 | 1.74950 |
| 2 | 44.5124 | 12.0000 | 53.75 | 1.69350 |
| 3 | 303.3092 | 0.2000 | | |
| 4 | 41.1365 | 6.6000 | 46.55 | 1.80411 |
| 5 | 62.6437 | 4.0000 | | |
| 6 | 117.4447 | 2.4000 | 29.46 | 1.71736 |
| 7 | 29.0175 | (d7 = variable) | | |
| 8 | 49.1261 | 4.9000 | 39.61 | 1.80454 |
| 9 | 429.6161 | 2.3000 | | |
| 10 | −72.2781 | 2.2000 | 33.75 | 1.64831 |
| 11 | 46.1243 | 4.2000 | | |
| 12 | ∞ | 3.4000 | (stop) | |
| 13 | −64.7161 | 2.0000 | 32.17 | 1.67270 |
| 14 | 53.4446 | 9.0000 | 39.82 | 1.86994 |
| 15 | −58.3755 | 0.2000 | | |
| 16 | 105.6470 | 3.4000 | 46.55 | 1.80411 |
| 17 | −269.3714 | (d17 = variable) | | |
| 18 | −263.6411 | 1.8000 | 49.45 | 1.77279 |
| 19 | −217.5969 | 38.1198 | | |

(Spacings variable during focusing)

| f,β | 85.0003 | −0.1000 |
|---|---|---|
| d7 | 17.5995 | 7.1687 |
| d17 | 1.0998 | 11.5306 |

(Values corresponding to conditions)

| (1) | F1/f | = 2.198 |
|---|---|---|
| (2) | F2/f | = 0.860 |
| (3) | F3/f | = 18.650 |
| (4) | D1/f | = 0.332 |
| (5) | S1/f | = 0.207 |
| (6) | r1/f | = 0.637 |
| (7) | r10/r9 | = −0.638 |
| (8) | Da/f | = 0.110 |
| (9) | Db/f | = 0.089 |
| (10) | Fa/f | = −1.804 |
| (11) | Fb/f | = 0.592 |
| (12) | r3/f | = 0.484 |
| (13) | r13/r11 | = 0.902 |
| (14) | f/r12 | = 1.590 |
| (15) | v1−v2 | = 15.36 |
| (16) | n7 | = 1.870 |
| (17) | v8−v4 | = 6.94 |
| (18) | r17/r16 | = 0.825 |

Figure 17:
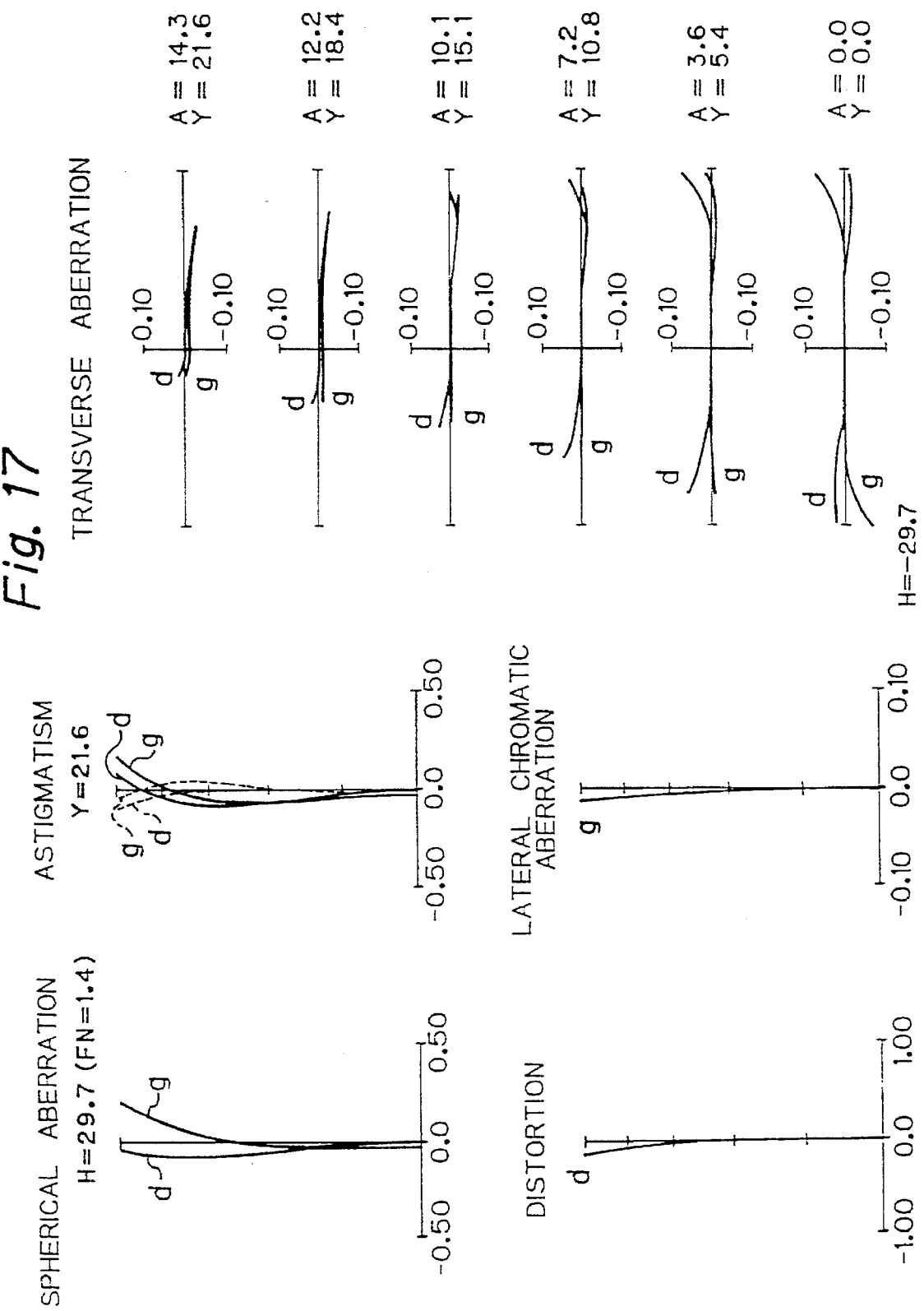
FIG. 17 graphically shows various aberrations when the lens system is focused at the infinite object point in the sixth embodiment.
Figure 18:
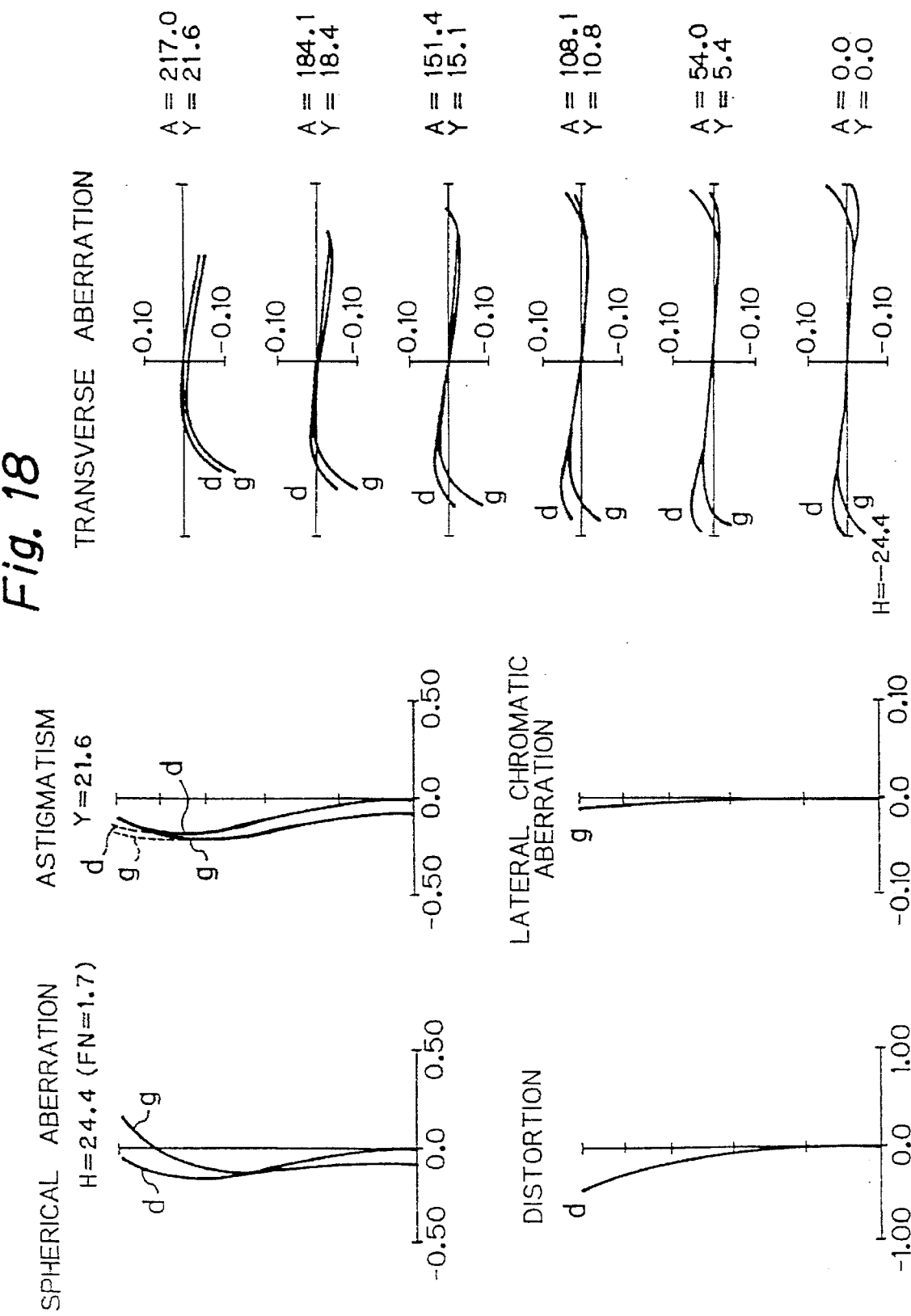
FIG. 18 graphically shows various aberrations when the image magnification is −1/10 in the sixth embodiment.

FIGS. 17 and 18 graphically show various aberrations at the infinite object point and at the image magnification β=−1/10, respectively, in the sixth embodiment. In these figures: FN is the f-number; Y is the image height; H is the height of entering ray; A is the incident angle of the chief ray; d is the spectral d-line (λ=587.6 nm); and g is the spectral g-line (λ=435.6 nm).

In the graphs showing astigmatism, the solid line represents the sagittal image surface, and the broken line represents the meridional image surface.

It will be understood from these figures that the a large aperture medium telephoto lens system in this embodiment is effectively corrected for various aberrations.

Figure 19:
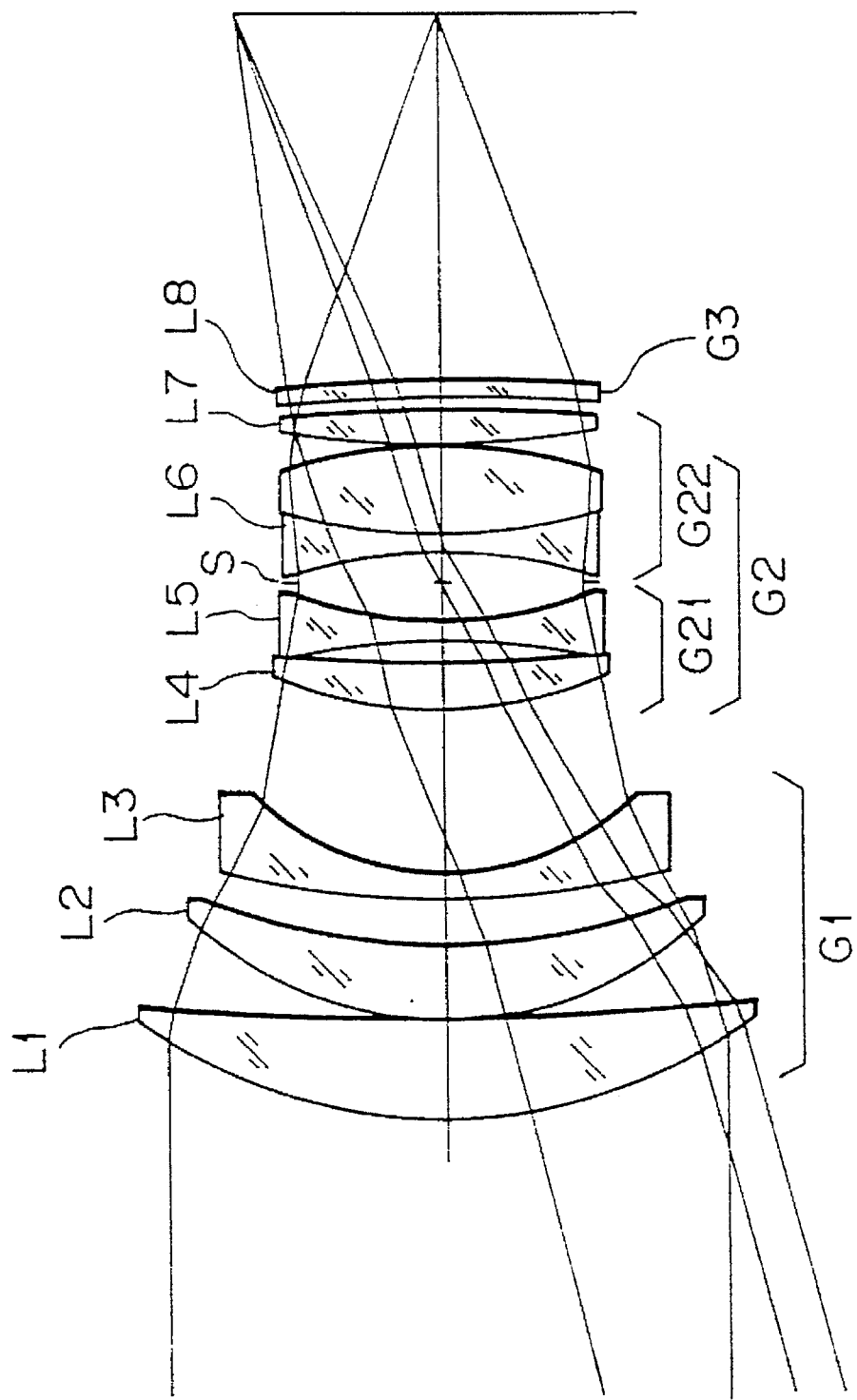
FIG. 19 shows the lens arrangement of a large aperture medium telephoto lens system according to a seventh embodiment of the present invention.

Seventh Embodiment:

FIG. 19 shows the lens arrangement of a large aperture medium telephoto lens system according to a seventh embodiment of the present invention.

As shown in FIG. 19, the a large aperture medium telephoto lens system includes, in order from the object side, a 1-st lens unit G1, a 2-nd lens unit G2, and a 3-rd lens unit G3. The 1-st lens unit G1 includes, in order from the object side, a positive meniscus lens element L1 having a convex surface directed toward the object side, a positive meniscus lens element L2 having a convex surface directed toward the object side, and a negative meniscus lens element L3 having a convex surface directed toward the object side. The 2-nd lens unit G2 includes, in order from the object side, a positive meniscus lens element L4 having a convex surface directed toward the object side, a biconcave lens element L5, an aperture stop S, a cemented lens component L6 of a biconcave lens element and a biconvex lens element, and a biconvex lens element L7. The 3-rd lens unit G3 has a positive meniscus lens element L8 having a concave surface directed toward the object side.

FIG. 19 shows the positional relationship between the lens units when the lens system is focused at the infinite object point. When the lens system is to be focused on an object at the closest focusing distance, the 2-nd lens unit G2 moves on the optical axis along an orbit indicated by the arrow in FIGS. 25(a) and 25(b).

The a large aperture medium telephoto lens system of the seventh embodiment has the same arrangement as that of the first embodiment but differs from the lens system of the first embodiment in the configuration of each lens unit.

The table below shows numerical data in the seventh embodiment of the present invention. In the table: f is the focal length when the lens system is focused at the infinite object point; FN is the f-number at the infinite object point; β is the image magnification when the lens system is focused at a near object point; and Bf is the back focus. In addition, the numerals at the left end show the ordinal Nos. of the lens surfaces from the object side, and r is the radius of curvature of each lens surface. d is the spacing between each pair of adjacent lens surfaces, and n and ν are respectively the refractive index and the Abbe's number for the spectral d-line (λ=587.6 nm).

f = 85.00
FN = 1.43
Bf = 38.12

| | r | d | ν | n |
|---|---|---|---|---|
| 1 | 55.2636 | 10.6000 | 65.42 | 1.60300 |
| 2 | 384.9799 | 0.2000 | | |
| 3 | 41.2922 | 7.8000 | 46.55 | 1.80411 |
| 4 | 69.1722 | 4.8000 | | |
| 5 | 104.8255 | 2.4000 | 29.46 | 1.71736 |
| 6 | 28.3235 | (d6 = variable) | | |
| 7 | 46.1595 | 5.0000 | 39.61 | 1.80454 |
| 8 | 221.8871 | 2.3000 | | |
| 9 | −85.5016 | 2.2000 | 33.75 | 1.64831 |
| 10 | 43.6253 | 4.0000 | | |
| 11 | ∞ | 3.4000 | (stop) | |
| 12 | −52.0570 | 2.0000 | 32.17 | 1.67270 |

-continued f = 85.00
FN = 1.43
Bf = 38.12

| | | | | |
|---|---|---|---|---|
| 13 | 66.5098 | 9.0000 | 39.82 | 1.86994 |
| 14 | −57.0184 | 0.2000 | | |
| 15 | 92.9245 | 4.0000 | 47.47 | 1.78797 |
| 16 | −197.5026 | (d16 = variable) | | |
| 17 | −298.8146 | 2.0000 | 49.45 | 1.77279 |
| 18 | −229.8009 | 38.1197 | | |

(Spacings variable during focusing)

| f,β | 85.0014 | −0.1000 |
|---|---|---|
| d6 | 17.6994 | 6.8809 |
| d16 | 1.0996 | 11.9181 |

(Values corresponding to conditions)

| (1) | F1/f | = 2.097 |
|---|---|---|
| (2) | F2/f | = 0.887 |
| (3) | F3/f | = 14.958 |
| (4) | D1/f | = 0.304 |
| (5) | S1/f | = 0.208 |
| (6) | r1/f | = 0.650 |
| (7) | r10/r9 | = −0.510 |
| (8) | Da/f | = 0.112 |
| (9) | Db/f | = 0.087 |
| (10) | Fa/f | = −1.804 |
| (11) | Fb/f | = 0.606 |
| (12) | r3/f | = 0.486 |
| (13) | r13/r11 | = 1.095 |
| (14) | f/r12 | = 1.278 |
| (15) | ν1−ν2 | = 18.87 |
| (16) | n7 | = 1.870 |
| (17) | ν8−ν4 | = 7.86 |
| (18) | r17/r16 | = 0.769 |

Figure 20:
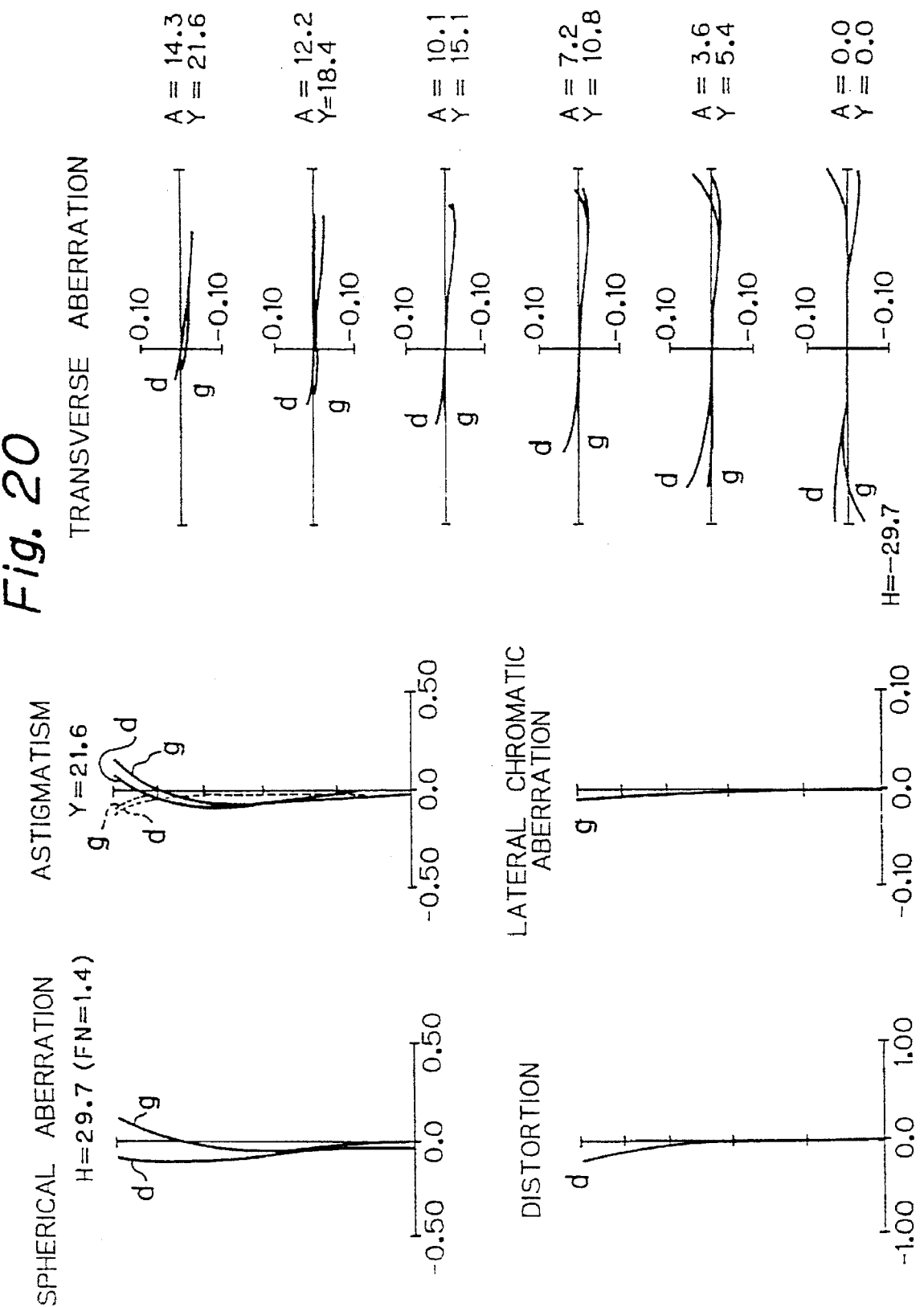
FIG. 20 graphically shows various aberrations when the lens system is focused at the infinite object point in the seventh embodiment.
Figure 21:
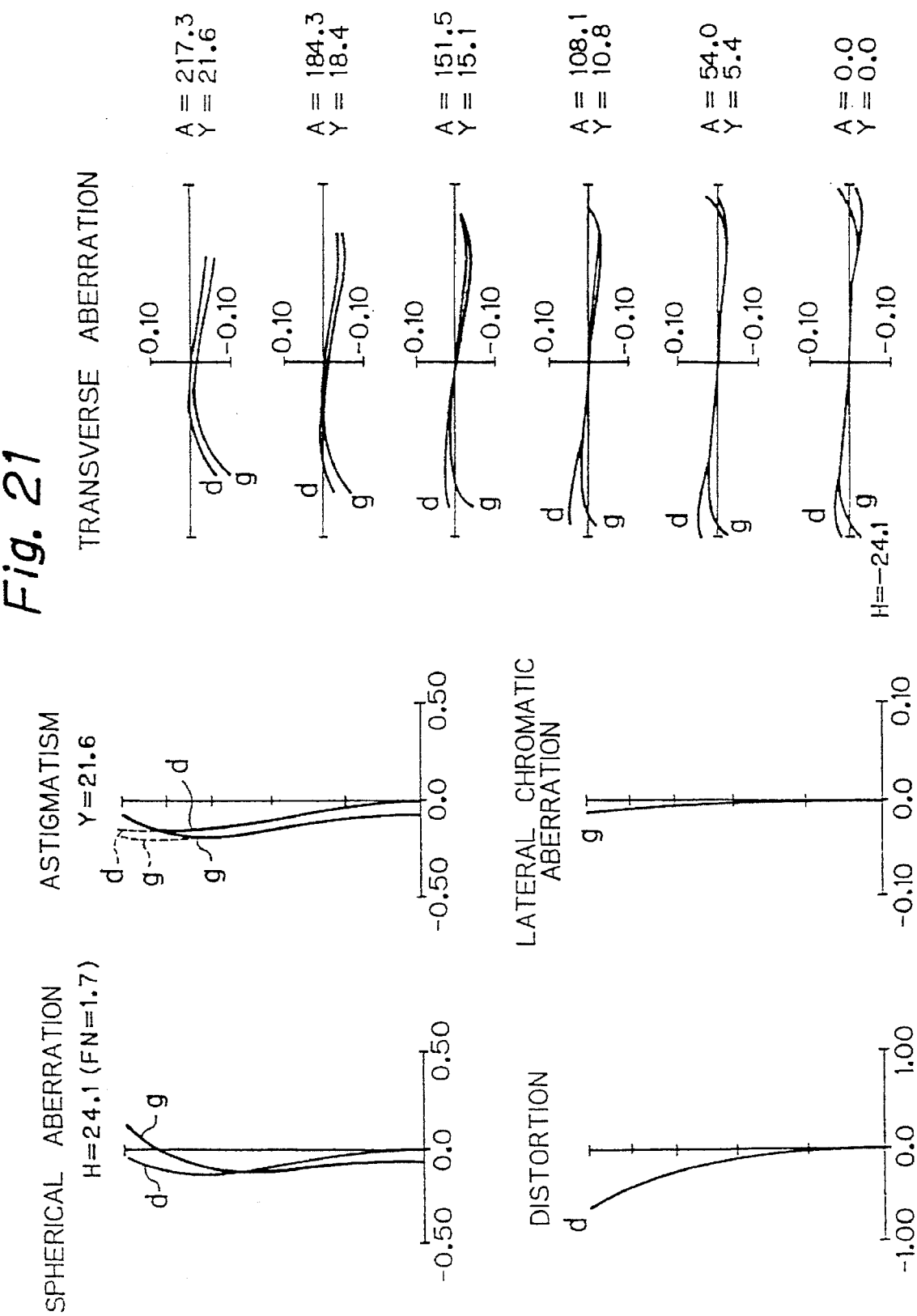
FIG. 21 graphically shows various aberrations when the image magnification is −1/10 in the seventh embodiment.

FIGS. 20 and 21 graphically show various aberrations at the infinite object point and at the image magnification β=−1/10, respectively, in the seventh embodiment. In these figures: FN is the f-number; Y is the image height; H is the height of entering ray; A is the incident angle of the chief ray; d is the spectral d-line (λ=587.6 nm); and g is the spectral g-line (λ=435.6 nm).

In the graphs showing astigmatism, the solid line represents the sagittal image surface, and the broken line represents the meridional image surface.

It will be understood from these figures that the a large aperture medium telephoto lens system in this embodiment is effectively corrected for various aberrations.

Figure 22:
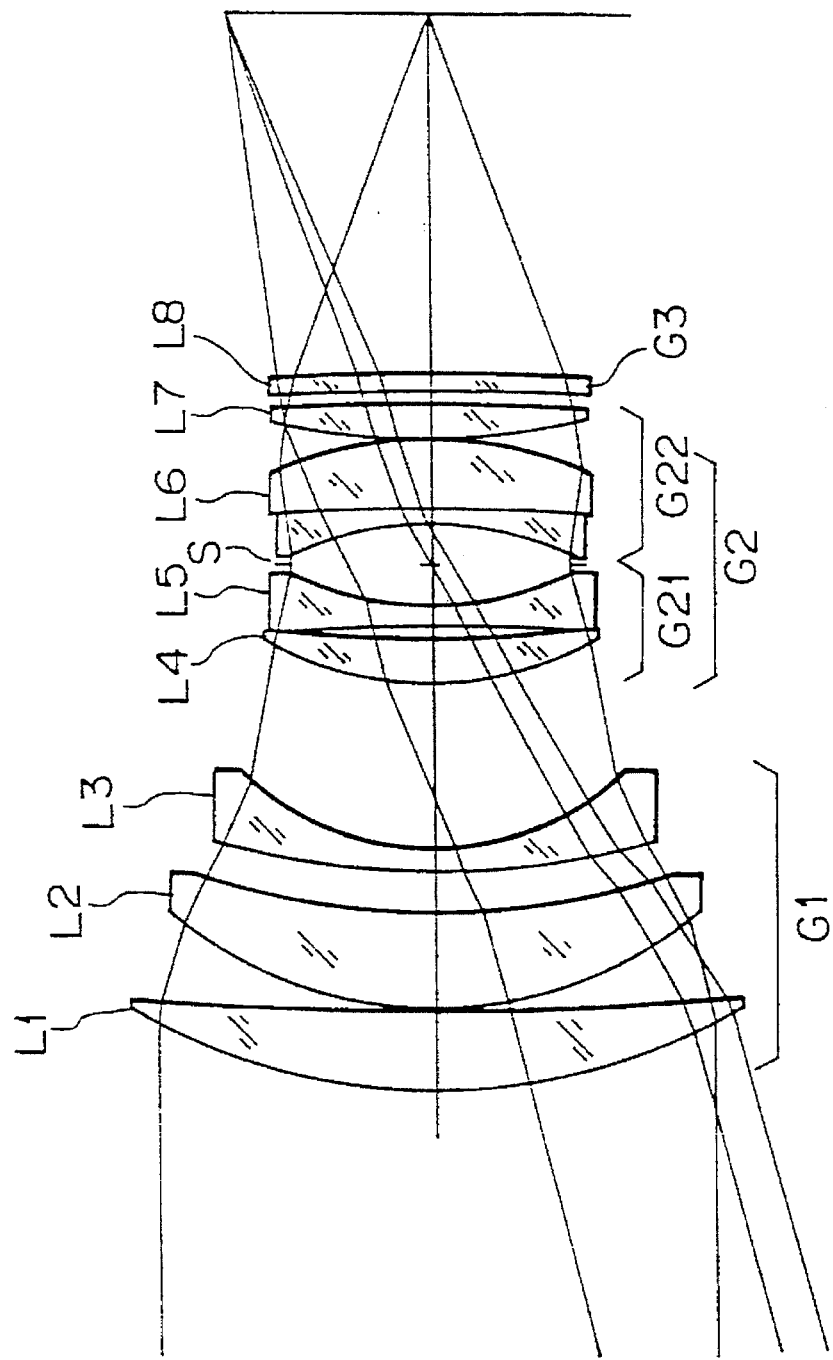
FIG. 22 shows the lens arrangement of a large aperture medium telephoto lens system according to an eighth embodiment of the present invention.

Eighth Embodiment:

FIG. 22 shows the lens arrangement of a large aperture medium telephoto lens system according to an eighth embodiment of the present invention.

As shown in FIG. 22, the a large aperture medium telephoto lens system includes, in order from the object side, a 1-st lens unit G1, a 2-nd lens unit G2, and a 3-rd lens unit G3. The 1-st lens unit G1 includes, in order from the object side, a positive meniscus lens element L1 having a convex surface directed toward the object side, a positive meniscus lens element L2 having a convex surface directed toward the object side, and a negative meniscus lens element L3 having a convex surface directed toward the object side. The 2-nd lens unit G2 includes, in order from the object side, a positive meniscus lens element L4 having a convex surface directed toward the object side, a biconcave lens element L5, an aperture stop S, a cemented lens component L6, which is composed of a negative meniscus lens element having a concave surface directed toward the object side, and a positive meniscus lens element having a concave surface directed toward the object side, and a biconvex lens element L7. The 3-rd lens unit G3 has a positive meniscus lens element L8 having a concave surface directed toward the object side.

FIG. 22 shows the positional relationship between the lens units when the lens system is focused at the infinite object point. When the lens system is to be focused on an object at the closest focusing distance, the 2-nd lens unit G2 moves on the optical axis along an orbit indicated by the arrow in FIGS. 25(a) and 25(b).

The a large aperture medium telephoto lens system of the eighth embodiment has the same arrangement as that of the first embodiment but differs from the lens system of the first embodiment in the configuration of each lens unit.

The table below shows numerical data in the eighth embodiment of the present invention. In the table: f is the focal length when the lens system is focused at the infinite object point; FN is the f-number at the infinite object point; β is the image magnification when the lens system is focused at a near object point; and Bf is the back focus. In addition, the numerals at the left end show the ordinal Nos. of the lens surfaces from the object side, and r is the radius of curvature of each lens surface. d is the spacing between each pair of adjacent lens surfaces, and n and ν are respectively the refractive index and the Abbe's number for the spectral d-line (λ=587.6 nm).

f = 85.00
FN = 1.43
Bf = 38.12

|   | r | d | ν | n |
| --- | --- | --- | --- | --- |
| 1 | 61.3733 | 9.0000 | 67.87 | 1.59319 |
| 2 | 435.9947 | 0.1000 | | |
| 3 | 43.2731 | 10.0000 | 49.45 | 1.77279 |
| 4 | 75.2024 | 4.8000 | | |
| 5 | 97.1944 | 2.4000 | 29.46 | 1.71736 |
| 6 | 29.6561 | (d6 = variable) | | |
| 7 | 35.4886 | 4.6000 | 39.61 | 1.80454 |
| 8 | 110.6255 | 1.8000 | | |
| 9 | −234.4505 | 2.0000 | 32.17 | 1.67270 |
| 10 | 33.7538 | 4.5000 | | |
| 11 | ∞ | 4.5000 | (stop) | |
| 12 | −32.2801 | 1.8000 | 32.17 | 1.67270 |
| 13 | −154.5386 | 7.2000 | 43.35 | 1.84042 |
| 14 | −39.0342 | 0.1000 | | |
| 15 | 71.6652 | 3.8000 | 49.45 | 1.77279 |
| 16 | −191.3473 | (d16 = variable) | | |
| 17 | −450.6878 | 2.0000 | 55.60 | 1.69680 |
| 18 | −301.5100 | 38.1177 | | |

(Spacings variable during focusing)

| f,β | 85.0011 | −0.1000 |
| --- | --- | --- |
| d6 | 17.7982 | 6.9395 |
| d16 | 1.1978 | 12.0566 |

(Values corresponding to conditions)

| (1) | F1/f | = 2.083 |
| --- | --- | --- |
| (2) | F2/f | = 0.883 |
| (3) | F3/f | = 15.295 |
| (4) | D1/f | = 0.309 |
| (5) | S1/f | = 0.209 |
| (6) | r1/f | = 0.722 |
| (7) | r10/r9 | = −0.144 |
| (8) | Da/f | = 0.099 |
| (9) | Db/f | = 0.106 |
| (10) | Fa/f | = −2.503 |
| (11) | Fb/f | = 0.645 |
| (12) | r3/f | = 0.509 |
| (13) | r13/r11 | = 1.209 |
| (14) | f/r12 | = −0.550 |
| (15) | ν1−ν2 | = 18.42 |
| (16) | n7 | = 1.840 |
| (17) | ν8−ν4 | = 9.84 |
| (18) | r17/r16 | = 0.669 |

Figure 23:
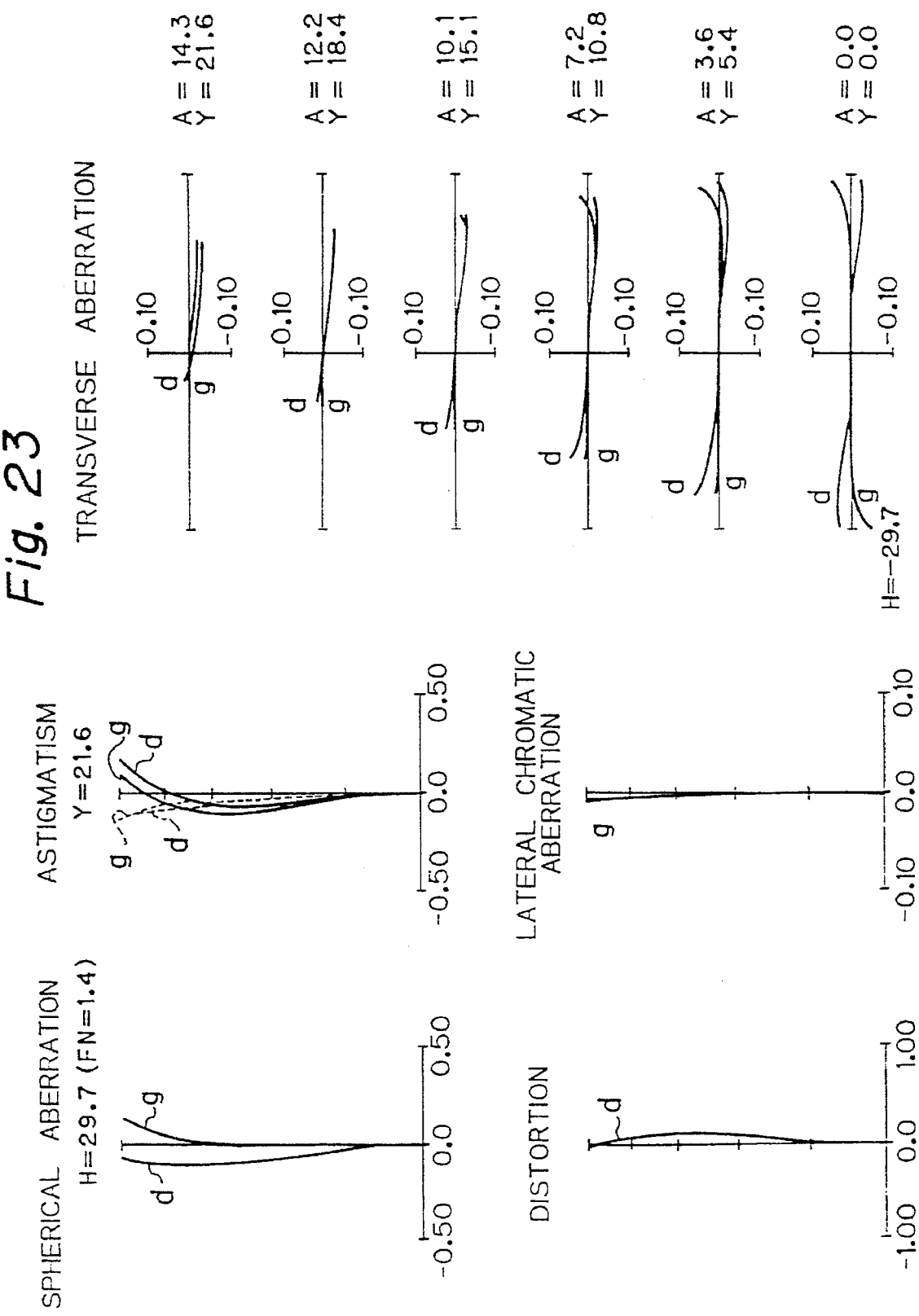
FIG. 23 graphically shows various aberrations when the lens system is focused at the infinite object point in the eighth embodiment.
Figure 24:
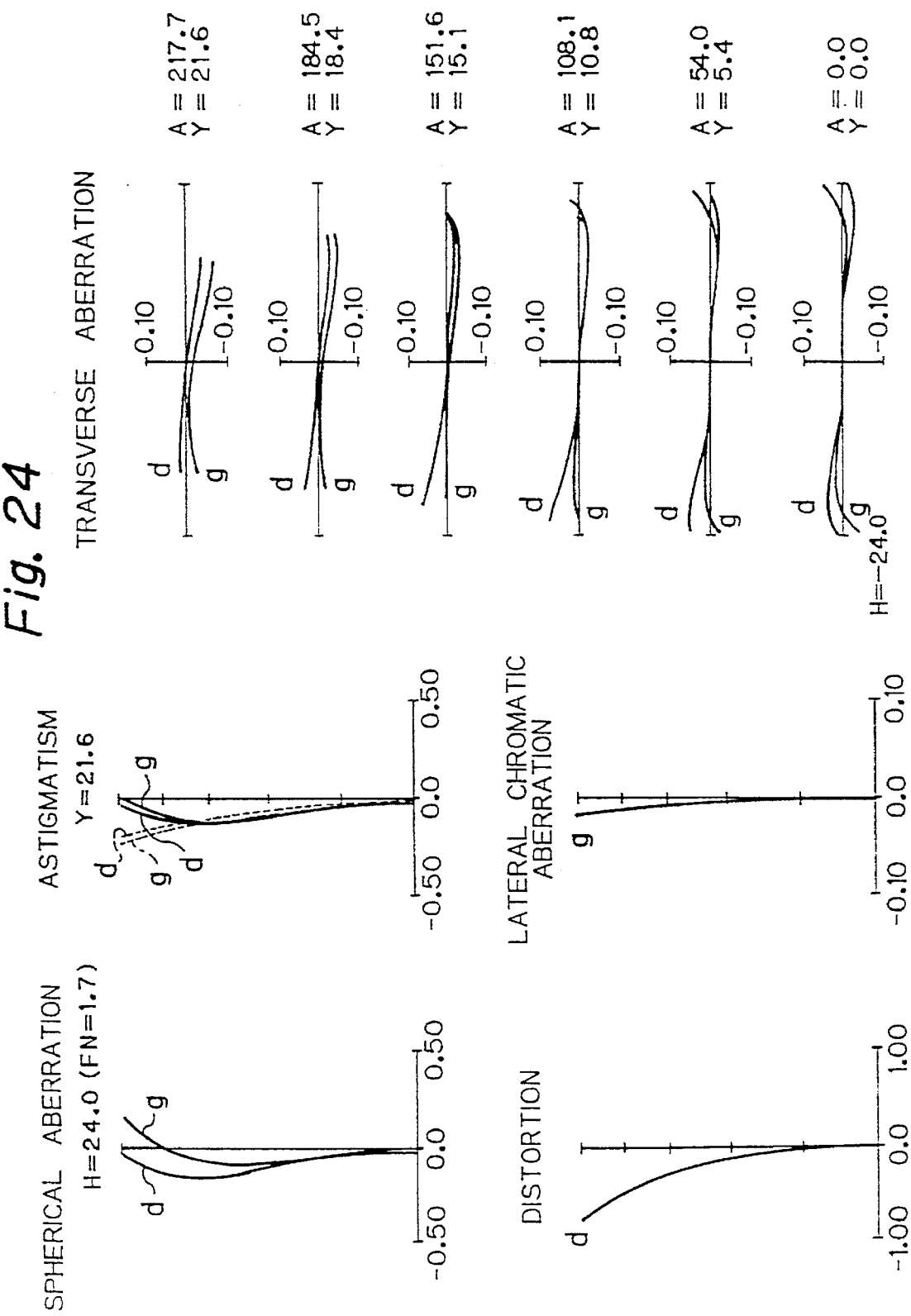
FIG. 24 graphically shows various aberrations when the image magnification is −1/10 in the eighth embodiment.

FIGS. 23 and 24 graphically show various aberrations at the infinite object point and at the image magnification β=−1/10, respectively, in the eighth embodiment. In these figures: FN is the f-number; Y is the image height; H is the height of entering ray; A is the incident angle of the chief ray; d is the spectral d-line (λ=587.6 nm); and g is the spectral g-line (λ=435.6 nm).

In the graphs showing astigmatism, the solid line represents the sagittal image surface, and the broken line represents the meridional image surface.

It will be understood from these figures that the a large aperture medium telephoto lens system in this embodiment is effectively corrected for various aberrations.

The reason why the spherical aberration and the field curvature are slightly under-corrected when the lens system is focused at a near object point in each embodiment of the present invention is that these aberrations are intentionally left so that the out-of-focus tone of the background, which is likely to degrade in this type of conventional lens system, is kept in a favorable state. Accordingly, the shift of the best image surface may be made substantially zero, if necessary.

The operation of the present invention will be described below.

Figure 26A:
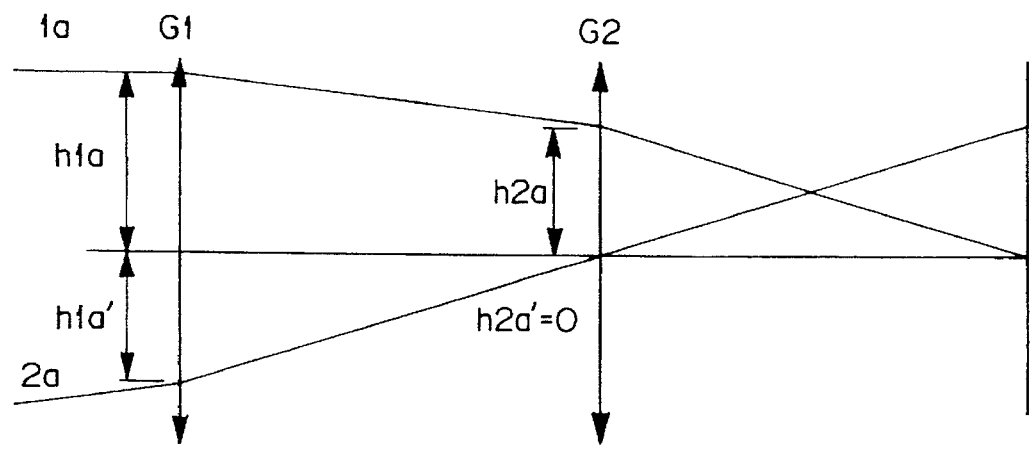
FIGS. 26(a) and 26(b) schematically show the refractive power distribution in the conventional rear focusing type lens system, together with the focusing operation thereof.
Figure 26B:
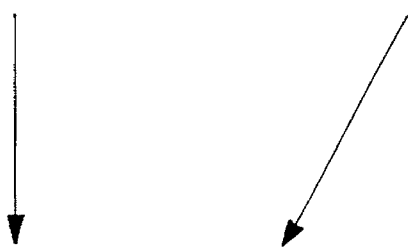

FIGS. 25(a) and 25(b) schematically show the refractive power distribution in the a large aperture medium telephoto lens system according to the present invention, together with the focusing operation thereof. FIGS. 26(a) and 26(b) schematically show the refractive power distribution in the conventional rear focusing type lens system, together with the focusing operation thereof. FIGS. 25(a) and 26(a) show the respective lens systems when focused at the infinite object point. FIGS. 25(b) and 26(b) show the respective lens systems when focused at a near object point.

As shown in FIGS. 26(a) and 26(b), the conventional rear focusing type lens system is composed of a 1-st lens unit G1 and a 2-nd lens unit G2, both of which have a positive refractive power, and arranged to effect focusing by moving only the 2-nd lens unit G2 along the optical axis.

In FIGS. 26(a) and 26(b), let us take notice of Rand rays 1a and 1b in the lens system when focused at the infinite object point and at the near object point. Assuming that the height h1a at which the ray 1a enters the 1-st lens unit G1 of the lens system as set for the infinite object point and the height h1b at which the ray 1b enters the 1-st lens unit G1 of the lens system as set for the near object point are equal to each other, when the 2-nd lens unit G2 is moved toward the object side to focus the lens system on a near object, the height of the ray passing through the 2-nd lens unit G2 changes inevitably; the ray height h2b in the lens system focused at the near object point is greater than the ray height h2a at the infinite object point. Consequently, the spherical aberration is under-corrected when the lens system is focused at the near object point.

Next, let us take notice of chief rays 2a and 2b in the lens system when focused at the infinite object point and at the near object point, shown in FIGS. 26(a) and 26(b). Assuming that the ray heights h2a' and h2b' in the 2-nd lens unit G2 as set for the infinite object point and for the near object point are zero, the height h1a' of the chief ray passing through the 1-st lens unit G1 when the lens system is focused at the infinite object point is inevitably greater than the height h1b' of the chief ray passing through the 1-st lens unit G1 at the near object point. Accordingly, it is generally difficult to suppress the variation of the image surface.

In contrast, the a large aperture medium telephoto lens system of the present invention is composed of three lens units G1 to G3, all of which have a positive refractive power, as shown in FIGS. 25(a) and 25(b), and it is arranged to effect focusing by moving only the 2-nd lens unit G2 along the optical axis. The 3-rd lens unit G3, which is a fixed lens unit, is disposed on the image side of the 2-nd lens unit G2, which is a movable lens unit, thereby canceling the variation of aberration produced inevitably when the lens system is focused at a near object point, and thus obtaining even more favorable closest distance performance.

In FIGS. 25(a) and 25(b), let us take notice of Rand rays 1a and 1b in the lens system when focused at the infinite object point and at the near object point. Assuming that the height h1a at which the ray 1a enters the 1-st lens unit G1 of the lens system as set for the infinite object point and the height h1b at which the ray 1b enters the 1-st lens unit G1 of the lens system as set for the near object point are equal to each other, when the 2-nd lens unit G2 is moved toward the object side to focus the lens system on a near object, the height of the ray passing through the 2-nd lens unit G2 changes inevitably; the ray height h2b in the lens system focused at the near object point is greater than the ray height h2a at the infinite object point.

With regard to the height of the ray passing through the 3-rd lens unit G3, however, the ray height h3a in the lens system focused at the infinite object point is greater than the ray height h3b at the near object point. As a result, the respective aberration correcting effects of the 2-nd and 3-rd lens units G2 and G3 cancel each other. Thus, even when the lens system is focused on a near object, the variation of spherical aberration can be effectively corrected.

Next, let us take notice of chief rays 2a and 2b in the lens system when focused at the infinite object point and at the near object point, shown in FIGS. 25(a) and 25(b). Assuming that the ray heights h2a' and h2b' in the 2-nd lens unit G2 as set for the infinite object point and for the near object point are zero, the height h1a' of the chief ray passing through the 1-st lens unit G1 when the lens system is focused at the infinite object point is inevitably greater than the height h1b' of the chief ray passing through the 1-st lens unit G1 when the lens system is focused at the near object point.

However, the height h3a' of the chief ray passing through the 3-rd lens unit G3 when the lens system is focused at the infinite object point is smaller than the height h3b' of the chief ray passing through the 3-rd lens unit G3 when the lens system is focused at the near object point. As a result, when the lens system is focused at the near object point, the reduction of the contribution made by the 1-st lens unit G1 is compensated by the increase of the contribution by the 3-rd lens unit G3. Thus, it becomes possible to suppress the variation of the image surface.

Thus, the a large aperture medium telephoto lens system of the present invention enables the annular spherical aberration and comatic aberration to be corrected even more effectively than in the case of the conventional Gauss type lens system. Moreover, it is possible to minimize the variation of the comatic aberration during focusing. Accordingly, the arrangement of the present invention is also most suitable for a portrait lens that provides soft out-of-focus tone.

Further, since the lens units are corrected for aberrations substantially independently of each other, it is also possible to realize an anti-shake lens system, which enables correction of the variation of the image position due to camera-shake or camera movement, by properly displacing (decentering) each lens unit constituting the present invention or some lens element thereof in a direction approximately perpendicular to the optical axis.

As has been described above, the present invention makes it possible to obtain a large aperture medium telephoto lens system with an f-number of about 1.4 which is capable of focusing by movement of a lens unit having a minimal number of lens elements and yet excellent in the image-forming performance for objects in the object distance range of from the infinite object point to the nearest object point.

What is claimed is:

1. A lens system comprising, in order from an object side, a 1-st lens unit having a positive refractive power, a 2-nd lens unit having a positive refractive power, and a 3-rd lens unit having a positive refractive power, wherein, during focusing, said 1-st and 3-rd lens units are fixed, whereas said 2-nd lens unit is movable along an optical axis, said lens system satisfying the following condition:

$$9 < F3/f < 20$$

where f is the focal length of the entire lens system, and F3 is the focal length of said 3-rd lens unit.

2. A lens system according to claim 1, which satisfies the following conditions:

$$0.28 < D1/f < 0.36$$

$$0.19 < S1/f < 0.23$$

where D1 is the axial thickness of said 1-st lens unit, S1 is the axial air spacing between said 1-st and 2-nd lens units when the lens system is focused at an infinite object point, and f is the focal length of the entire lens system.

3. A lens system according to claim 1, which satisfies the following condition:

$$0.62 < r1/f < 1.0$$

where r1 is the radius of curvature of an object-side surface of a lens element in said 1-st lens unit that is closest to the object side, and f is the focal length of the entire system.

4. A lens system according to claim 3, wherein said 1-st lens unit includes, in order from the object side, two positive lens elements, and one negative lens element, and said 2-nd lens unit has, in order from the object side, a positive lens element, a negative lens element, and a cemented lens component of a negative and a positive lens element.

5. A lens system according to claim 4, which satisfies the following conditions:

$$0.62 < r1/f < 1.0$$

$$15 < v1 - v2 < 27$$

$$0.3 < r17/r16 < 0.9$$

where f is the focal length of the entire lens system, r1 is the radius of curvature of an object-side surface of a lens element in said 1-st lens unit that is closest to the object side, r16 is the radius of curvature of an object-side surface of the positive lens element in said 3-rd lens unit, r17 is the radius of curvature of an image-side surface of the positive lens element in said 3-rd lens unit, v1 is the Abbe's number of the positive lens element in said 1-st lens unit that is closest to the object side, and v2 is the Abbe's number of the 2-nd positive lens element in said 1-st lens unit from the object side.

6. A lens system comprising, in order from an object side, a 1-st lens unit having a positive refractive power, a 2-nd lens unit having a positive refractive power, and a 3-rd lens unit having a positive refractive power, wherein, during focusing, said 1-st and 3-rd lens units are fixed, whereas said 2-nd lens unit is movable along an optical axis, said lens system satisfying the following conditions:

$$1.8 < F1/f < 2.4$$

$9 < F3/f < 20$ where f is the focal length of the entire lens system, F1 is the focal length of said 1-st lens unit, and F3 is the focal length of said 3-rd lens unit.

7. A lens system comprising, in order from an object side, a 1-st lens unit having a positive refractive power, a 2-nd lens unit having a positive refractive power, and a 3-rd lens unit having a positive refractive power, wherein, during focusing, said 1-st and 3-rd lens units are fixed, whereas said 2-nd lens unit is movable along an optical axis, said lens system satisfying the following conditions:

$0.8 < F2/f < 0.96$ $9 < F3/f < 20$ where f is the focal length of the entire lens system, F2 is the focal length of said 2-nd lens unit, and F3 is the focal length of said 3-rd lens unit.

8. A lens system comprising, in order from an object side, a 1-st lens unit having a positive refractive power, a 2-nd lens unit having a positive refractive power, and a 3-rd lens unit having a positive refractive power, wherein, during focusing, said 1-st and 3-rd lens units are fixed, whereas said 2-nd lens unit is movable along an optical axis, said lens system satisfying the following conditions:

$1.8 < F1/f < 2.4$ $0.8 < F2/f < 0.96$ $9 < F3/f < 20$ where f is the focal length of the entire lens system, F1 is the focal length of said 1-st lens unit, F2 is the focal length of said 2-nd lens unit, and F3 is the focal length of said 3-rd lens unit.

9. A lens system according to claim 8, which satisfies the following conditions:

$0.28 < D1/f < 0.36$ $0.19 < S1/f < 0.23$ where D1 is the axial thickness of said 1-st lens unit, S1 is the axial air spacing between said 1-st and 2-nd lens units when the lens system is focused at an infinite object point, and f is the focal length of the entire lens system.

10. A lens system according to claim 8, which satisfies the following condition:

$0.62 < r1/f < 1.0$ where r1 is the radius of curvature of an object-side surface of a lens element in said 1-st lens unit that is closest to the object side, and f is the focal length of the entire lens system.

11. A lens system according to claim 8, wherein said 1-st lens unit includes, in order from the object side, two positive lens elements, and one negative lens element, and said 2-nd lens unit has, in order from the object side, a positive lens element, a negative lens element, and a cemented lens component of a negative and a positive lens element.

12. A lens system according to claim 9, wherein said 1-st lens unit includes, in order from the object side, two positive lens elements, and one negative lens element, and said 2-nd lens unit has, in order from the object side, a positive lens element, a negative lens element, and a cemented lens component of a negative and a positive lens element.

13. A lens system according to claim 11, which satisfies the following conditions:

$0.62 < r1/f < 1.0$ $15 < v1 - v2 < 27$ $0.3 < r17/r16 < 0.9$ where f is the focal length of the entire lens system, r1 is the radius of curvature of an object-side surface of a lens element in said 1-st lens unit that is closest to the object side, r16 is the radius of curvature of an object-side surface of the positive lens element in said 3-rd lens unit, r17 is the radius of curvature of an image-side surface of the positive lens element in said 3-rd lens unit, v1 is the Abbe's number of the positive lens element in said 1-st lens unit that is closest to the object side, and v2 is the Abbe's number of the 2-nd positive lens element in said 1-st lens unit from the object side.

14. A lens system according to claim 12, which satisfies the following conditions:

$0.62 < r1/f < 1.0$ $15 < v1 - v2 < 27$ $0.3 < r17/r16 < 0.9$ where f is the focal length of the entire lens system, r1 is the radius of curvature of an object-side surface of a lens element in said 1-st lens unit that is closest to the object side, r16 is the radius of curvature of an object-side surface of the positive lens element in said 3-rd lens unit, r17 is the radius of curvature of an image-side surface of the positive lens element in said 3-rd lens unit, v1 is the Abbe's number of the positive lens element in said 1-st lens unit that is closest to the object side, and v2 is the Abbe's number of the 2-nd positive lens element in said 1-st lens unit from the object side.

15. A lens system comprising, in order from an object side, a 1-st lens unit having a positive refractive power, a 2-nd lens unit having a positive refractive power, and a 3-rd lens unit having a positive refractive power, said 1-st lens unit including, in order from the object side, a positive lens element having a convex surface directed toward the object side, a positive meniscus lens element having a convex surface directed toward the object side, and a negative meniscus lens element having a convex surface directed toward the object side, said 2-nd lens unit including two sub units, that is, a front sub unit and a rear sub unit, in order from the object side, said front sub unit including, in order from the object side, a positive lens element having a convex surface directed toward the object side, and a negative lens element whose image-side surface is more steeply concaved than an object-side surface thereof, said rear sub unit including, in order from the object side, a cemented lens component and a positive lens element, said cemented lens component including a negative lens element having a concave surface directed toward the object side, and a positive lens element having a convex surface directed toward the image side, said 2-nd lens unit further including an aperture stop disposed between said front and rear sub units, said 3-rd lens unit including a positive lens element, said lens system satisfying the following conditions:

$0.28 < D1/f < 0.36$ $0.19 < S1/f < 0.23$ $0.62 < r1/f < 1.0$ where D1 is the axial thickness of said 1-st lens unit, S1 is the axial air spacing between said 1-st and 2-nd lens units when the lens system is focused at an infinite object point, f is the focal length of the entire lens system, and r1 is the radius of curvature of an object-side surface of said positive lens element closest to the object side in said 1-st lens unit which has a convex surface directed toward the object side.

16. A lens system according to claim 15, which satisfies the following condition:

$$-0.8 < r10/r9 < 0$$

where r9 is the radius of curvature of the object-side surface of said negative lens element in said 2-nd lens unit whose image-side surface is more steeply concaved than the object-side surface thereof, and r10 is the radius of curvature of the image-side surface of said negative lens element in said 2-nd lens unit whose image-side surface is more steeply concaved than the object-side surface thereof.

17. A lens system according to claim 16, which satisfies the following conditions:

$$0.08 < Da/f < 0.13$$

$$0.07 < Db/f < 0.13$$

where f is the focal length of the entire lens system, Da is the axial thickness of the front sub unit in said 2-nd lens unit, and Db is the axial air spacing between the front and rear sub units in said 2-nd lens unit when the lens system is focused at an infinite object point.

18. A lens system according to claim 17, which satisfies the following conditions:

$$-3 < Fa/f < -1.5$$

$$0.57 < Fb/f < 0.7$$

where f is the focal length of the entire lens system, Fa is the focal length of the front sub unit in said 2-nd lens unit, and Fb is the focal length of the rear sub unit in said 2-nd lens unit.

19. A lens system according to claim 18, which satisfies the following conditions:

$$0.47 < r3/f < 0.53$$

$$0.9 < r13/r11 < 1.4$$

$$-0.8 < f/r12 < 1.7$$

$$15 < v1-v2 < 27$$

$$1.84 \leq n7$$

$$3 < v8-v4 < 12$$

$$0.3 < r17/r16 < 0.9$$

where f is the focal length of the entire lens system, r3 is the radius of curvature of an object-side surface of the positive meniscus lens element in said 1-st lens unit, r11 is the radius of curvature of an object-side surface of the cemented lens component in said 2-nd lens unit, r13 is the radius of curvature of an image-side surface of the cemented lens component in said 2-nd lens unit, r12 is the radius of curvature of a cemented surface of the cemented lens component in said 2-nd lens unit, r16 is the radius of curvature of an object-side surface of the positive lens element in said 3-rd lens unit, r17 is the radius of curvature of an image-side surface of the positive lens element in said 3-rd lens unit, v1 is the Abbe's number of the positive lens element in said 1-st lens unit that is closest to the object side, v2 is the Abbe's number of the 2-nd positive lens element in said 1-st lens unit from the object side, v4 is the Abbe's number of the positive lens element in said 2-nd lens unit that is closest to the object side, v8 is the Abbe's number of the positive lens element in said 2-nd lens unit that is closest to the image side, and n7 is the refractive index of the positive lens element constituting the cemented lens component in said 2-nd lens unit.

20. A lens system according to claim 18, which satisfies the following conditions:

$$15 < v1-v2 < 27$$

$$3 < v8-v4 < 12$$

where v1 is the Abbe's number of the positive lens element in said 1-st lens unit that is closest to the object side, v2 is the Abbe's number of the 2-nd positive lens element in said 1-st lens unit from the object side, v4 is the Abbe's number of the positive lens element in said 2-nd lens unit that is closest to the object side, and v8 is the Abbe's number of the positive lens element in said 2-nd lens unit that is closest to the image side.

21. A lens system comprising, in order from an object side, a 1-st lens unit having a positive refractive power, a 2-nd lens unit having a positive refractive power, and a 3-rd lens unit having a positive refractive power, said 1-st lens unit including, in order from the object side, a positive lens element having a convex surface directed toward the object side, a positive meniscus lens element having a convex surface directed toward the object side, and a negative meniscus lens element having a convex surface directed toward the object side, said 2-nd lens unit including two sub units, that is, a front sub unit and a rear sub unit, in order from the object side, said front sub unit including, in order from the object side, a positive lens element having a convex surface directed toward the object side, and a negative lens element whose image-side surface is more steeply concaved than an object-side surface thereof, said rear sub unit including, in order from the object side, a cemented lens component and a positive lens element, said cemented lens component including a negative lens element having a concave surface directed toward the object side, and a positive lens element having a convex surface directed toward the image side, said 2-nd lens unit further including an aperture stop disposed between said front and rear sub units, said 3-rd lens unit including a positive lens element, said lens system satisfying the following conditions:

$$0.28 < D1/f < 0.36$$

$$0.19 < S1/f < 0.23$$

$$-0.8 < r10/r9 < 0$$

where D1 is the axial thickness of said 1-st lens unit, S1 is the axial air spacing between said 1-st and 2-nd lens units when the lens system is focused at an infinite object point, f is the focal length of the entire lens system, r9 is the radius of curvature of the object-side surface of said negative lens element in said 2-nd lens unit whose image-side surface is more steeply concaved than the object-side surface thereof, and r10 is the radius of curvature of the image-side surface of said negative lens element in said 2-nd lens unit whose image-side surface is more steeply concaved than the object-side surface thereof.

22. A lens system comprising, in order from an object side, a 1-st lens unit having a positive refractive power, a 2-nd lens unit having a positive refractive power, and a 3-rd lens unit having a positive refractive power, said 1-st lens unit including, in order from the object side, a positive lens element having a convex surface directed toward the object side, a positive meniscus lens element having a convex surface directed toward the object side, and a negative meniscus lens element having a convex surface directed toward the object side, said 2-nd lens unit including two sub units, that is, a front sub unit and a rear sub unit, in order from the object side, said front sub unit including, in order from the object side, a positive lens element having a convex surface directed toward the object side, and a negative lens element whose image-side surface is more steeply concaved than an object-side surface thereof, said rear sub unit including, in order from the object side, a cemented lens component and a positive lens element, said cemented lens component including a negative lens element having a concave surface directed toward the object side, and a positive lens element having a convex surface directed toward the image side, said 2-nd lens unit further including an aperture stop disposed between said front and rear sub units, said 3-rd lens unit including a positive lens element, said lens system satisfying the following conditions:

$0.28 < D1/f < 0.36$ $0.19 < S1/f < 0.23$ $15 < \nu1 - \nu2 < 27$ where D1 is the axial thickness of said 1-st lens unit, S1 is the axial air spacing between said 1-st and 2-nd lens units when the lens system is focused at an infinite object point, f is the focal length of the entire lens system, ν1 is the Abbe's number of the positive lens element in said 1-st lens unit that is closest to the object side, and ν2 is the Abbe's number of the second positive lens element in said 1-st lens unit from the object side.

23. A lens system comprising, in order from an object side, a 1-st lens unit having a positive refractive power, a 2-nd lens unit having a positive refractive power, and a 3-rd lens unit having a positive refractive power, said 1-st lens unit including, in order from the object side, a positive lens element having a convex surface directed toward the object side, a positive meniscus lens element having a convex surface directed toward the object side, and a negative meniscus lens element having a convex surface directed toward the object side, said 2-nd lens unit including two sub units, that is, a front sub unit and a rear sub unit, in order from the object side, said front sub unit including, in order from the object side, a positive lens element having a convex surface directed toward the object side, and a negative lens element whose image-side surface is more steeply concaved than an object-side surface thereof, said rear sub unit including, in order from the object side, a cemented lens component and a positive lens element, said cemented lens component including a negative lens element having a concave surface directed toward the object side, and a positive lens element having a convex surface directed toward the image side, said 2-nd lens unit further including an aperture stop disposed between said front and rear sub units, said 3-rd lens unit including a positive lens element, said lens system satisfying the following conditions:

$0.28 < D1/f < 0.36$ $0.19 < S1/f < 0.23$ $0.08 < Da/f < 0.13$ $0.07 < Db/f < 0.13$ where D1 is the axial thickness of said 1-st lens unit, S1 is the axial air spacing between said 1-st and 2-nd lens units when the lens system is focused at an infinite object point, f is the focal length of the entire lens system, Da is the axial thickness of the front sub unit in said 2-nd lens unit, and Db is the axial air spacing between the front and rear sub units in said 2-nd lens unit when the lens system is focused at the infinite object point.

24. A lens system according to claim 23, which satisfies the following conditions:

$-3 < Fa/f < -1.5$ $0.57 < Fb/f < 0.7$ where f is the focal length of the entire lens system, Fa is the focal length of the front sub unit in said 2-nd lens unit, and Fb is the focal length of the rear sub unit in said 2-nd lens unit.

25. A lens system comprising, in order from an object side, a 1-st lens unit having a positive refractive power, a 2-nd lens unit having a positive refractive power, and a 3-rd lens unit having a positive refractive power, said 1-st lens unit including, in order from the object side, a positive lens element having a convex surface directed toward the object side, a positive meniscus lens element having a convex surface directed toward the object side, and a negative meniscus lens element having a convex surface directed toward the object side, said 2-nd lens unit including two sub units, that is, a front sub unit and a rear sub unit, in order from the object side, said front sub unit including, in order from the object side, a positive lens element having a convex surface directed toward the object side, and a negative lens element whose image-side surface is more steeply concaved than an object-side surface thereof, said rear sub unit including, in order from the object side, a cemented lens component and a positive lens element, said cemented lens component including a negative lens element having a concave surface directed toward the object side, and a positive lens element having a convex surface directed toward the image side, said 2-nd lens unit further including an aperture stop disposed between said front and rear sub units, said 3-rd lens unit including a positive lens element, said lens system satisfying the following conditions:

$1.8<F1/f<2.4$ $0.8<F2/f<0.96$ $9<F3/f<20$ where f is the focal length of the entire lens system, F1 is the focal length of said 1-st lens unit, F2 is the focal length of said 2-nd lens unit, and F3 is the focal length of said 3rd lens unit.

26. A lens system according to claim 25, which satisfies the following conditions:

$0.28<D1/f<0.36$ $0.19<S1/f<0.23$ where D1 is the axial thickness of said 1-st lens unit, S1 is the axial air spacing between said 1-st and 2-nd lens units when the lens system is focused at an infinite object point, and f is the focal length of the entire lens system.

27. A lens system according to claim 26, which satisfies the following conditions:

$0.08<Da/f<0.13$ $0.07<Db/f<0.13$ where f is the focal length of the entire lens system, Da is the axial thickness of the front sub unit in said 2-nd lens unit, and Db is the axial air spacing between the front and rear sub units in said 2-nd lens unit when the lens system is focused at an infinite object point.

28. A lens system comprising, in order from an object side, a 1-st lens unit having a positive refractive power, a 2-nd lens unit having a positive refractive power, and a 3-rd lens unit having a positive refractive power, said 1-st lens unit including, in order from the object side, a positive lens element having a convex surface directed toward the object side, a positive meniscus lens element having a convex surface directed toward the object side, and a negative meniscus lens element having a convex surface directed toward the object side, said 2-nd lens unit including two sub units, that is, a front sub unit and a rear sub unit, in order from the object side, said front sub unit including, in order from the object side, a positive lens element having a convex surface directed toward the object side, and a negative lens element whose image-side surface is more steeply concaved than an object-side surface thereof, said rear sub unit including, in order from the object side, a cemented lens component and a positive lens element, said cemented lens component including a negative lens element having a concave surface directed toward the object side, and a positive lens element having a convex surface directed toward the image side, said 2-nd lens unit further including an aperture stop disposed between said front and rear sub units, said 3-rd lens unit including a positive lens element, said lens system satisfying the following conditions:

$0.28<D1/f<0.36$ $0.19<S1/f<0.23$ $-3<Fa/f<-1.5$ $0.57<Fb/f<0.7$ where D1 is the axial thickness of said 1-st lens unit, S1 is the axial air spacing between said 1-st and 2-nd lens units when the lens system is focused at an infinite object point, f is the focal length of the entire lens system, Fa is the focal length of the front sub unit in said 2-nd lens unit, and Fb is the focal length of the rear sub unit in said 2-nd lens unit.

29. A lens system according to claim 28, which satisfies the following conditions:

$0.62<r1/f<1.0$ $-0.8<r10/r9<0$ where f is the focal length of the entire lens system, r1 is the radius of curvature of an object-side surface of said positive lens element closest to the object side in said 1-st lens unit which has a convex surface directed toward the object side, r9 is the radius of curvature of the object-side surface of said negative lens element in said 2-nd lens unit whose image-side surface is more steeply concaved than the object-side surface thereof, and r10 is the radius of curvature of the image-side surface of said negative lens element in said 2-nd lens unit whose image-side surface is more steeply concaved than the object-side surface thereof.

30. A lens system according to claim 29, which satisfies the following conditions:

$0.47<r3/f<0.53$ $0.9<r13/r11<1.4$ $-0.8<f/r12<1.7$ $15<v1-v2<27$ $1.84 \leq n7$ $3<v8-v4<12$ $0.3<r17/r16<0.9$ where f is the focal length of the entire lens system, r3 is the radius of curvature of an object-side surface of the positive meniscus lens element in said 1-st lens unit, r11 is the radius of curvature of an object-side surface of the cemented lens component in said 2-nd lens unit, r13 is the radius of curvature of an image-side surface of the cemented lens component in said 2-nd lens unit, r12 is the radius of curvature of a cemented surface of the cemented lens component in said 2-nd lens unit, r16 is the radius of curvature of an object-side surface of the positive lens element in said 3-rd lens unit, r17 is the radius of curvature of an image-side surface of the positive lens element in said 3-rd lens unit, v1 is the Abbe's number of the positive lens element in said 1-st lens unit that is closest to the object side, v2 is the Abbe's number of the 2-nd positive lens element in said 1-st lens unit from the object side, v4 is the Abbe's number of the positive lens element in said 2-nd lens unit that is closest to the object side, v8 is the Abbe's number of the positive lens element in said 2-nd lens unit that is closest to the image side, and n7 is the refractive index of the positive lens element of the cemented lens component in said 2-nd lens unit.

31. A lens system according to claim 29, which satisfies the following conditions:

$15<v1-v2<27$ $3<v8-v4<12$ where v1 is the Abbe's number of the positive lens element in said 1-st lens unit that is closest to the object side, v2 is the Abbe's number of the 2-nd positive lens element in said 1-st lens unit from the object side, ν4 is the Abbe's number of the positive lens element in said 2-nd lens unit that is closest to the object side, and ν8 is the Abbe's number of the positive lens element in said 2-nd lens unit that is closest to the image side.

32. A lens system comprising, in order from an object side, a 1-st lens unit having a positive refractive power, a 2-nd lens unit having a positive refractive power, and a 3-rd lens unit having a positive refractive power, said 1-st lens unit including, in order from the object side, a positive lens element having a convex surface directed toward the object side, a positive meniscus lens element having a convex surface directed toward the object side, and a negative meniscus lens element having a convex surface directed toward the object side, said 2-nd lens unit including two sub units, that is, a front sub unit and a rear sub unit, in order from the object side, said front sub unit including, in order from the object side, a positive lens element having a convex surface directed toward the object side, and a negative lens element whose image-side surface is more steeply concaved than an object-side surface thereof, said rear sub unit including, in order from the object side, a cemented lens component and a positive lens element, said cemented lens component including a negative lens element having a concave surface directed toward the object side, and a positive lens element having a convex surface directed toward the image side, said 2-nd lens unit further including an aperture stop disposed between said front and rear sub units, said 3-rd lens unit including a positive lens element,
said lens system satisfying the following conditions:

$$0.28 < D1/f < 0.36$$

$$0.19 < S1/f < 0.23$$

$$3 < \nu8 - \nu4 < 12$$

where D1 is the axial thickness of said 1-st lens unit, S1 is the axial air spacing between said 1-st and 2-nd lens units when the lens system is focused at an infinite object point, f is the focal length of the entire lens system, ν4 is the Abbe's number of the positive lens element in said 2-nd lens unit that is closest to the object side, and ν8 is the Abbe's number of the positive lens element in said 2-nd lens unit that is closest to the image side.

33. A lens system comprising, in order from an object side, a 1-st lens unit having a positive refractive power, a 2-nd lens unit having a positive refractive power, and a 3rd lens unit having a positive refractive power, said 1-st lens unit including, in order from the object side, a positive lens element having a convex surface directed toward the object side, a positive meniscus lens element having a convex surface directed toward the object side, and a negative meniscus lens element having a convex surface directed toward the object side, said 2-nd lens unit including two sub units, that is, a front sub unit and a rear sub unit, in order from the object side, said front sub unit including, in order from the object side, a positive lens element having a convex surface directed toward the object side, and a negative lens element whose image-side surface is more steeply concaved than an object-side surface thereof, said rear sub unit including, in order from the object side, a cemented lens component and a positive lens element, said cemented lens component including a negative lens element having a concave surface directed toward the object side, and a positive lens element having a convex surface directed toward the image side, said 2-nd lens unit further including an aperture stop disposed between said front and rear sub units, said 3-rd lens unit including a positive lens element,
said lens system satisfying the following conditions:

$$0.62 < r1/f < 1.0$$

$$-0.8 < r10/r9 < 0$$

where f is the focal length of the entire lens system, r1 is the radius of curvature of an object-side surface of said positive lens element closest to the object side in said 1-st lens unit which has a convex surface directed toward the object side, r9 is the radius of curvature of the object-side surface of said negative lens element in said 2-nd lens unit whose image-side surface is more steeply concaved than the object-side surface thereof, and r10 is the radius of curvature of the image-side surface of said negative lens element in said 2-nd lens unit whose image-side surface is more steeply concaved then the object-side surface thereof.

34. A lens system according to claim 33, which satisfies the following conditions:

$$0.08 < Da/f < 0.13$$

$$0.07 < Db/f < 0.13$$

where f is the focal length of the entire lens system, Da is the axial thickness of the front sub unit in said 2-nd lens unit, and Db is the axial air spacing between the front and rear sub units in said 2-nd lens unit when the lens system is focused at an infinite object point.

35. A lens system according to claim 33, which satisfies the following condition:

$$15 < \nu1 - \nu2 < 27$$

where ν1 is the Abbe's number of the positive lens element in said 1-st lens unit that is closest to the object side, and ν2 is the Abbe's number of the second positive lens element in said 1-st lens unit from the object side.

36. A lens system according to claim 35, which satisfies the following conditions:

$$-3 < Fa/f < -1.5$$

$$0.57 < Fb/f < 0.7$$

where f is the focal length of the entire lens system, Fa is the focal length of the front sub unit in said 2-nd lens unit, and Fb is the focal length of the rear sub unit in said 2-nd lens unit.

37. A lens system according to claim 34, which satisfies the following conditions:

$$-3 < Fa/f < -1.5$$

$$0.57 < Fb/f < 0.7$$

where f is the focal length of the entire lens system, Fa is the focal length of the front sub unit in said 2-nd lens unit, and Fb is the focal length of the rear sub unit in said 2-nd lens unit.

38. A lens system according to claim 37, which satisfies the following conditions:

$0.47 < r3/f < 0.53$ $0.9 < r13/r11 < 1.4$ $-0.8 < f/r12 < 1.7$ $15 < v1-v2 < 27$ $1.84 \leq n7$ $3 < v8-v4 < 12$ $0.3 < r17/r16 < 0.9$ where f is the focal length of the entire lens system, r3 is the radius of curvature of an object-side surface of the positive meniscus lens element in said 1-st lens unit, r11 is the radius of curvature of an object-side surface of the cemented lens component in said 2-nd lens unit, r13 is the radius of curvature of an image-side surface of the cemented lens component in said 2-nd lens unit, r12 is the radius of curvature of a cemented surface of the cemented lens component in said 2-nd lens unit, r16 is the radius of curvature of an object-side surface of the positive lens element in said 3-rd lens unit, r17 is the radius of curvature of an image-side surface of the positive lens element in said 3-rd lens unit, v1 is the Abbe's number of the positive lens element in said 1-st lens unit that is closest to the object side, v2 is the Abbe's number of the 2-nd positive lens element in said 1-st lens unit from the object side, v4 is the Abbe's number of the positive lens element in said 2-nd lens unit that is closest to the object side, v8 is the Abbe's number of the positive lens element in said 2-nd lens unit that is closest to the image side, and n7 is the refractive index of the positive lens element of the cemented lens component in said 2-nd lens unit.

39. A lens system according to claim 37, which satisfies the following conditions:

$15 < v1-v2 < 27$ $3 < v8-v4 < 12$ where v1 is the Abbe's number of the positive lens element in said 1-st lens unit that is closest to the object side, v2 is the Abbe's number of the 2-nd positive lens element in said 1-st lens unit from the object side, v4 is the Abbe's number of the positive lens element in said 2-nd lens unit that is closest to the object side, and v8 is the Abbe's number of the positive lens element in said 2-nd lens unit that is closest to the image side.

* * * * *